(12) United States Patent
Goodwin et al.

(10) Patent No.: US 7,855,348 B2
(45) Date of Patent: Dec. 21, 2010

(54) MULTIPLE ILLUMINATION SOURCES TO LEVEL SPECTRAL RESPONSE FOR MACHINE VISION CAMERA

(75) Inventors: Mark D. Goodwin, Apalachin, NY (US); Mathew S. Hale, Barton, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 535 days.

(21) Appl. No.: 11/824,826

(22) Filed: Jul. 3, 2007

(65) Prior Publication Data

US 2008/0017556 A1 Jan. 24, 2008

Related U.S. Application Data

(60) Provisional application No. 60/819,136, filed on Jul. 7, 2006.

(51) Int. Cl.
*G06K 9/00* (2006.01)
*G01J 3/46* (2006.01)

(52) U.S. Cl. ........................ 209/584; 356/402

(58) Field of Classification Search ................ 356/400, 356/402; 209/584; 382/101
See application file for complete search history.

(56) References Cited

U.S. PATENT DOCUMENTS

| | | | |
|---|---|---|---|
| 4,205,462 A | 6/1980 | Van Wilson et al. | |
| 4,493,420 A | 1/1985 | Dennis | |
| 4,922,337 A | 5/1990 | Hunt et al. | |
| 5,154,246 A | 10/1992 | DiGiulio et al. | |
| 5,178,224 A | 1/1993 | DiGiulio et al. | |
| 5,625,470 A * | 4/1997 | Ueta et al. | 358/475 |
| 5,914,486 A * | 6/1999 | Yamamoto | 358/514 |
| 5,998,753 A | 12/1999 | Darchis et al. | |
| 6,075,562 A | 6/2000 | Sakaguchi et al. | |
| 6,236,735 B1 | 5/2001 | Bjorner et al. | |
| 6,370,844 B1 | 4/2002 | Stricker | |
| 6,534,763 B2 | 3/2003 | Krohn et al. | |
| 6,559,889 B2 | 5/2003 | Tanaka et al. | |
| 6,809,330 B2 | 10/2004 | Krohn et al. | |
| 6,878,896 B2 | 4/2005 | Braginsky et al. | |
| 7,069,247 B1 | 6/2006 | Oppedahl | |
| 7,138,970 B2 | 11/2006 | Krohn | |
| 2003/0011829 A1 | 1/2003 | Dierickx | |
| 2003/0086818 A1 | 5/2003 | Holley, Jr. et al. | |
| 2003/0103866 A1 | 6/2003 | Wang et al. | |
| 2003/0107887 A1 * | 6/2003 | Eberl | 362/227 |
| 2003/0168507 A1 | 9/2003 | Mihaylov et al. | |
| 2004/0042022 A1 | 3/2004 | Friedman et al. | |
| 2004/0051853 A1 | 3/2004 | Nishida et al. | |
| 2004/0183088 A1 | 9/2004 | DenBaars et al. | |

(Continued)

*Primary Examiner*—Kara E Geisel
(74) *Attorney, Agent, or Firm*—Wolf, Greenfield & Sacks, P.C.

(57) ABSTRACT

In one embodiment, an apparatus comprises a camera and a group of light emitting diodes configured and arranged to illuminate an object imaged by the camera. The group of LEDs comprises at least one first LED of a first type that emits light with a first spectrum profile and at least one second LED of a second type that emits light with a second spectrum profile that is substantially different than the first spectrum profile. The apparatus may further comprise an adjustment mechanism for adjusting of the relative amounts of illumination energy generated by the at least one first LED and the at least one second LED during each of a plurality of scan cycles of the camera.

24 Claims, 17 Drawing Sheets

U.S. PATENT DOCUMENTS

| | | |
|---|---|---|
| 2005/0093982 A1 | 5/2005 | Kuroki |
| 2005/0156982 A1 | 7/2005 | Ueda |
| 2005/0163339 A1 | 7/2005 | Watanabe et al. |
| 2006/0098433 A1 | 5/2006 | Chaleff et al. |
| 2006/0120563 A1 | 6/2006 | Kehley et al. |
| 2006/0152140 A1 | 7/2006 | Brandes |
| 2006/0291691 A1* | 12/2006 | Laws ......................... 382/101 |

* cited by examiner

MULTIPLE ILLUMINATION SOURCES TO LEVEL SPECTRAL RESPONSE FOR MACHINE VISION CAMERA

RELATED APPLICATIONS

This application claims the benefit under 35 U.S.C. §119 (e) of provisional application Ser. No. 60/819,136, entitled MULTIPLE ILLUMINATION SOURCES TO LEVEL SPECTRAL RESPONSE FOR MACHINE VISION CAMERA, and filed on Jul. 7, 2006, the entire contents of which are incorporated herein by reference.

FIELD OF INVENTION

This invention relates generally mail sorting systems and equipment used therein.

BACKGROUND

The U.S. Postal Service (USPS) has developed standards for the marking of mailpieces that facilitate the automatic sorting and processing of such items. Such mailpiece features include stamps, metermarks, information based indicia (IBI) barcodes (PDF417 and Data Matrix), facing identification marks (FIM), Postal Numeric Encoding Technique (POSTNET) codes, postal alphanumeric encoding technique (PLANET) codes, 4CB codes, and identification (ID) tags. The purpose and use of such features are well known in the art and thus will not be described in detail.

Line scan cameras have been implemented in numerous industrial and commercial settings, such as on high-speed mail sorting systems. An example of a prior art mail sorting system that employed such cameras, as well as several other components, is illustrated in FIG. 1. As shown, the mail sorting system 2 comprised a singulation stage 4, a first indicia detection stage 6, a facing inversion stage 8, a second indicia detection stage 10, a cancellation stage 12, an inversion stage 14, an ID tag spraying stage 16, an image lifting stage 18, and a stacking stage 20. One or more conveyors (not shown) would move mailpieces 19 from stage to stage in the system 2 (from left to right in FIG. 1) at a rate of approximately 3.6-4.0 meters per second.

The singulation stage 4 included a feeder pickoff 22 and a fine cull 24. The feeder pickoff 22 would generally follow a mail stacker (not shown) and would attempt to feed one mailpiece at a time from the mail stacker to the fine cull 24, with a consistent gap between mailpieces. The fine cull 24 would remove mailpieces that were too tall, too long, or perhaps too stiff. When mailpieces 19 left the fine cull 24, they would ideally be in one of four possible orientations, as illustrated by mailpieces 19a-d.

Each of the first and second indicia detection stages 6, 10 included a pair of indicia detectors 26a-b, 26c-d positioned to check the lower edges (of approximately one inch) of the opposite faces of a passing mailpiece 19 for reactance to ultraviolet (UV) radiation and for FIM marks, and thereby detect indicia at such locations. As used herein, "indicia" refers to any marking on a mailpiece that represents a postage value. If the first indicia detection stage 6 failed to detect any indicia on either lower edge of a given mailpiece, that mailpiece would be inverted by an inverter 9 at the facing inversion stage 10 so as to allow the second indicia detection stage 10 to check the lower one inch edges of the other side of the mailpiece for indicia. As a result, each mailpiece 19 that had detectable indicia thereon ideally ended up positioned with the edge containing the indicia (the "top edge" of the mailpiece) facing downward after it left the second indicia detection stage 10, with at least one of the indicia detectors 26a-d having identified the face of the mailpiece that contained the indicia.

The cancellation stage 12 included a pair of cancellers 28a-b arranged to spray one side of the top edge of the mailpiece (i.e., the side determined to contain the indicia), and thereby cancel the indicia. Following the cancellation stage 12, each mailpiece would be inverted by an inverter 15 at the inversion stage 14 so that the top edge of the mailpiece was made to face upwards. The ID tag spraying stage 16 included a pair of ID tag sprayers 30a-b arranged to spray an ID tag, as needed, along an appropriate one of the two lower edges of the mailpiece, as determined by the facing decision made by the indicia detection stages 6, 10.

The image lifting stage 18 included a pair of line scanning cameras 32a-b that imaged the mailpiece. Each line scanning camera provided a two hundred and twelve pixel per inch (PPI) image for address recognition. An analysis of the accumulated images facilitated a determination of the one of several output bins 34a-g of the stacking stage 20 into which the mailpieces was to be stacked based on certain criteria.

SUMMARY

According to one aspect of the present invention, an apparatus comprises a camera and a group of light emitting diodes (LEDs) configured and arranged to illuminate an object imaged by the camera. The group of LEDs comprises a first plurality of LEDs of a first type that emit light with a first spectrum profile and a second plurality of LEDs of a second type that emit light with a second spectrum profile that is substantially different than the first spectrum profile.

According to another aspect, a method involves energizing a group of LEDs included in a camera system to generate illumination having a particular spectrum profile. At least some of the illumination reflected from an object is detected with a group of photodetectors included in the camera system to generate an image of the object. The group of LEDs comprises a first plurality of LEDs of a first type that emit light with a first spectrum profile and a second plurality of LEDs of a second type that emit light with a second spectrum profile that is substantially different than the first spectrum profile.

According to another aspect, an apparatus comprises a camera and a group of light emitting diodes configured and arranged to illuminate an object imaged by the camera. The group of LEDs comprises at least one first LED of a first type that emits light with a first spectrum profile and at least one second LED of a second type that emits light with a second spectrum profile that is substantially different than the first spectrum profile. The apparatus further comprises an adjustment mechanism for adjusting of the relative amounts of illumination energy generated by the at least one first LED and the at least one second LED during each of a plurality of scan cycles of the camera.

According to another aspect, a method involves moving an object on a conveyor past a line scanning camera, and acquiring a plurality of individual lines of an image of the object at a rate determined by a speed of the conveyor so that a particular number of lines per unit length of the object are acquired by the line scanning camera. Activation and deactivation of an illumination source that illuminates the object for imaging is controlled so as to synchronize discrete periods during which illumination is provided by the illumination source with line scan periods during which the individual lines are acquired by the line scanning camera.

According to another aspect, an apparatus comprises a line scanning camera, a conveyor, an illumination source, and at least one controller. The conveyor is configured and arranged to move objects past the line scanning camera so that the objects can be imaged thereby. The illumination source is configured and arranged to illuminate the objects for imaging by the line scanning camera. The at least one controller is configured to cause the line scanning camera to acquire a plurality of individual lines of an image of the object at a rate determined by a speed of the conveyor so that a particular number of lines per unit length of the object are acquired by the line scanning camera, and is further configured to control activation and deactivation of the illumination source so as to synchronize discrete periods during which illumination is provided by the illumination source with line scan periods during which individual lines are acquired by the line scanning camera.

According to another aspect, an apparatus comprises a line scanning camera, a conveyor, an illumination source, at least one controller, and means for controlling activation and deactivation of the illumination source. The conveyor is configured and arranged to move objects past the line scanning camera so that the objects can be imaged thereby. The illumination source is configured and arranged to illuminate the objects for imaging by the line scanning camera. The at least one controller configured to cause the line scanning camera to acquire a plurality of individual lines of an image of the object at a rate determined by a speed of the conveyor so that a particular number of lines per unit length of the object are acquired by the line scanning camera. The means for controlling activation and deactivation of the illumination source causes discrete periods during which illumination is provided by the illumination source to be synchronized with line scan periods during which individual lines are acquired by the line scanning camera.

DETAILED DESCRIPTION

We have appreciated that existing mail processing equipment could be improved with improved and differently organized system components. Improvements in the type and organization of components may, for example, increase the speed or accuracy with which mail is sorted. Additionally, improvements may reduce the overall cost and increase reliability of mail processing equipment.

Figure 2:
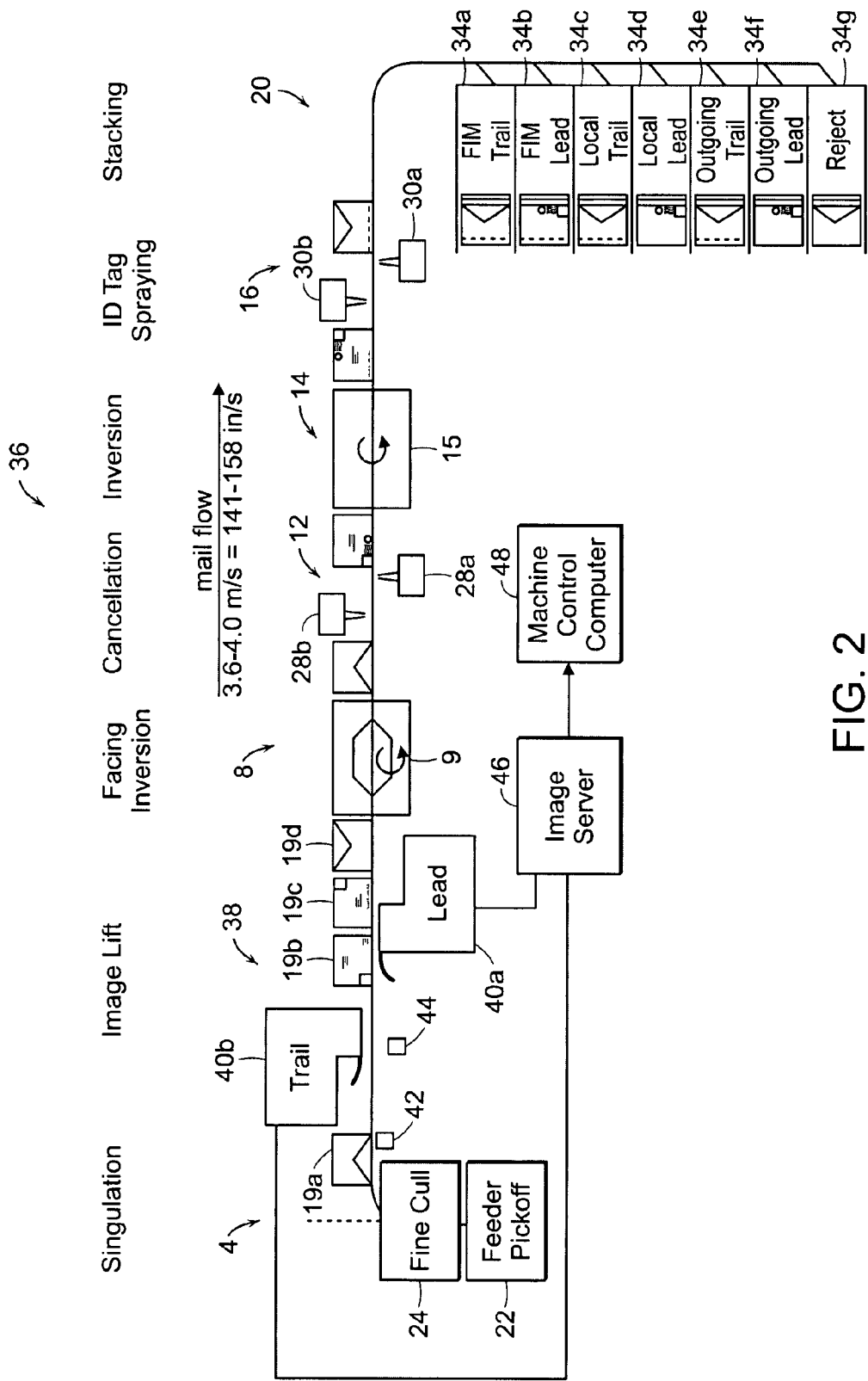
FIG. 2 is a diagram of an illustrative example of a mail sorting system in which at least some embodiments of the invention may be employed.

An illustrative example of a mail processing system embodying improved and differently organized components is shown in FIG. 2. In this example, the mail processing system is a mail sorting system in which mailpieces are carried through the system on a mail conveyor, such as a belt or series of belts. As mailpieces pass through the system, they are imaged. The image information may be used for routing the mailpieces to appropriate output locations. In addition, the image information may be used with the mail sorting system for tasks such as determining whether postage is affixed, locating indicia to which a cancellation mark is applied, positioning a bar code or similar markings on the mailpiece, or determining other markings, features and/or characteristics of the mailpiece.

Figure 1:
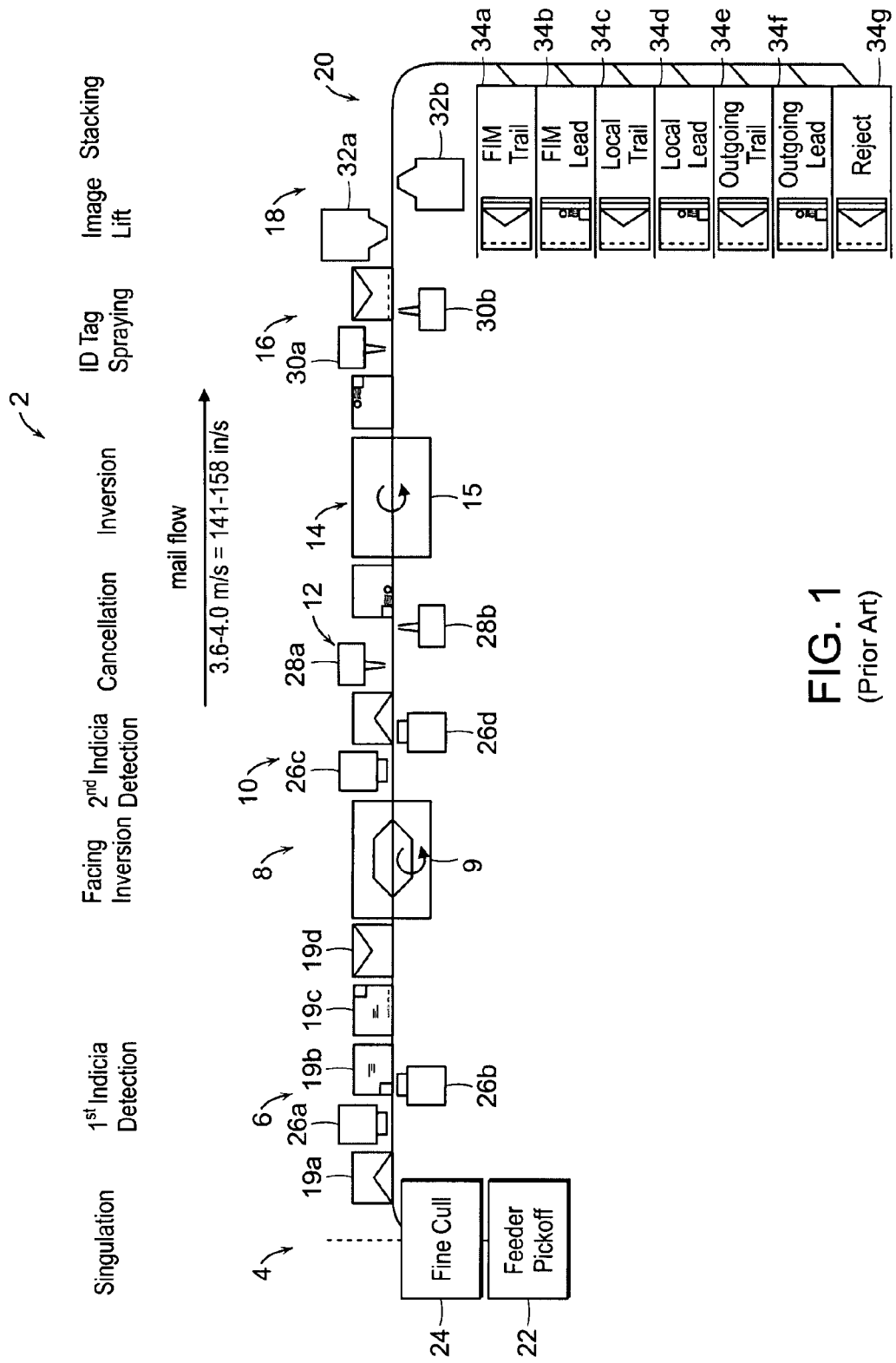
FIG. 1 is a diagram of a prior art mail sorting system.

As shown, mail sorting system 36 of FIG. 2 is similar to the mail sorting system 2 of FIG. 1 insofar as it comprises a singulation stage 4, a facing inversion stage 8, a cancellation stage 12, an inversion stage 14, an ID tag spraying stage 16, and a stacking stage 20. In contrast to the system 2, however, in the system 36, all of the functionality of the first indicia detection stage 6, the second indicia detection stage 10, and the image lifting station 18 may be achieved by a single pair of camera assemblies 40a-b (described in more detail below) included in an image lifting stage 38. As shown, the image lifting stage 38 is located between the singulation stage 4 and the facing inversion stage 8 of the system 36, but image lifting stage 38 may be incorporated into system 36 in any suitable location.

In operation, each of the camera assemblies 40a-b acquires both a low-resolution UV image and a high-resolution grayscale image of a respective one of the two faces of each passing mailpiece 19. Because the UV images are of the entire face of the mailpiece, rather than just the lower one inch edge, there is no need to invert the mailpiece when making a facing determination.

Each of the camera assemblies illustrated in FIG. 2 is constructed to acquire both a low-resolution UV image and a high-resolution grayscale image, and such assemblies may be used in embodiments of the invention. It should be appreciated, however, the invention is not limited in this respect. Components to capture a UV image and a grayscale image may be separately housed in alternative embodiments. It should be further appreciated that the invention is not limited to embodiments with two or more camera assemblies as shown. A single assembly could be constructed with an opening through which mailpieces may pass, allowing components in a single housing to form images of one or multiple faces of a mailpiece. Similarly, optical processing, such as through the use of mirrors, could allow a single assembly to capture images of one or multiple faces of a mailpiece.

Further, it should be appreciated that UV and grayscale are representative of the types of image information that may be acquired rather than a limitation on the invention. For example, a color image may be acquired. Consequently, any suitable imaging components may be included in system 36.

As shown, the system 36 may further include an item presence detector 42, a belt encoder 44, an image server 46, and a machine control computer 48. The item presence detector 42 (examples of an item presence detector are a "photo eye" or a "light barrier") may be located, for example, five inches upstream of the trail camera assembly 40b, to indicate when a mailpiece is approaching. The belt encoder 44 may output pulses (or "ticks") at a rate determined by the travel speed of the belt. For example, the belt encoder 44 may output two hundred and fifty six pulses per inch of belt travel. The combination of the item presence detector 42 and belt encoder 44 thus enables a relatively precise determination of the location of each passing mailpiece at any given time. Such location and timing information may be used, for example, to control the strobing of light sources in the camera assemblies 40a-b to ensure optimal performance independent of variations in belt speed.

Image information acquired with the camera assemblies 40a-b or other imaging components may be processed for control of the mail sorting system or for use in routing mailpieces passing through the system 36. Processing may be performed in any suitable way with one or more processors. In the illustrated embodiment, processing is performed by image server 46.

The image server 46 may receive image data from the camera assemblies 40a-b, and process and analyze such data to extract certain information about the orientation of and various markings on each mailpiece. In some embodiments, for example, images may be analyzed using a neural network, a pattern analysis algorithm, or a combination thereof. Either or both of the grayscale images and the UV images may be so processed and analyzed, and the results of such analysis may be used by other components in the system 36, or perhaps by components outside the system, for sorting or any other purpose.

In the embodiment shown, information obtained from processing images is used for control of components in the system 36 by providing that information to a separate processor that controls the system. The information obtained from the images, however, may additionally or alternatively be used in any other suitable way for any of a number of other purposes. In the pictured embodiment, control for the system 36 is provided by a machine control computer 48. Though not expressly shown, the machine control computer 48 may be connected to any or all of the components in the system 36 that may output status information or receive control inputs. The machine control computer 48 may, for example, access information extracted by the image server 46, as well as information from other components in the system, and use such information to control the various system components based thereupon. Details concerning particular algorithms executed by the image server 46 and other hardware or firmware in the system are provided in U.S. Patent Application Publication Nos. 2008/0008376, 2008/0008377, 2008/0008378, 2008/0008383, and 2008/0008379,respectively entitled DETECTION AND IDENTIFICATION OF POSTAL INDICIA, SYSTEM AND METHOD FOR REAL-TIME DETERMINATION OF THE ORIENTATION OF AN ENVELOPE, ARBITRATION SYSTEM FOR DETERMINING THE ORIENTATION OF AN ENVELOPE FROM A PLURALITY OF CLASSIFIERS, DETECTION AND IDENTIFICATION OF POSTAL METERMARKS, and POSTAL INDICIA CATEGORIZATION SYSTEM. Each of the foregoing applications is incorporated herein by reference in its entirety.

In the example shown, the camera assembly 40a is called the "lead" assembly because it is positioned so that, for mailpieces in an upright orientation, the indicia (in the upper right hand corner) is on the leading edge of the mailpiece 19 with respect to its direction of travel. Likewise, the camera assembly 40b is called the "trail" assembly because it is positioned so that, for mailpieces in an upright orientation, the indicia is on the trailing edge of the mailpiece with respect to its direction of travel. Upright mailpieces themselves are also conventionally labeled as either "lead" or "trail" depending on whether their indicia is on the leading or trailing edge with respect to the direction of travel.

Following the last scan line of the lead camera assembly 40a, the image server 46 may determine an orientation of "flip" or "no-flip" for the inverter 9. In particular, the inverter 9 is controlled so that that each mailpiece 19 has its top edge down when it reaches the cancellation stage 12, thus enabling one of the cancellers 28a-b to spray a cancellation mark on any indicia properly affixed to a mailpiece by spraying only the bottom edge of the path (top edge of the mailpiece). The image server 46 may also make a facing decision that determines which canceller (lead 28a or trail 28b) should be used to spray the cancellation mark. Other information recognized by the image server 46, such as IBI, may also be used, for example, to disable cancellation of IBI postage since IBI would otherwise be illegible downstream.

After cancellation, all mailpieces may be inverted by the inverter 15, thus placing each mailpiece 19 in its upright orientation. Immediately thereafter, an ID tag may be sprayed using one of the ID tag sprayers 30a-b that is selected based on the facing decision made by the image server 46. In some embodiments, all mailpieces with a known orientation may be sprayed with an ID tag. In other embodiments, ID tag spraying may be limited to only those mailpieces without an existing ID tag (forward, return, foreign).

Following application of ID tags, the mailpieces 19 may ride on extended belts for drying before being placed in output bins or otherwise routed for further processing. In the example shown, there are seven output bins 34a-g. Except for rejects (bin 34g), the output bins 34a-f are in pairs to separate lead mailpieces from trail mailpieces. It is desirable for the mailpieces 19 in each output bin to face identically. The operator may thus rotate trays properly so as to orient lead and trail mailpieces the same way. The mail may be separated into four broad categories: (1) FIM A&C (FIM with POSTNET), (2) outgoing (destination is a different SCF), (3) local (destination is within this SCF), and (4) reject (detected double feeds, not possible to sort into other categories). The decision of outgoing vs. local, for example, may be based on the image analysis performed by the image server 46.

Figure 3:
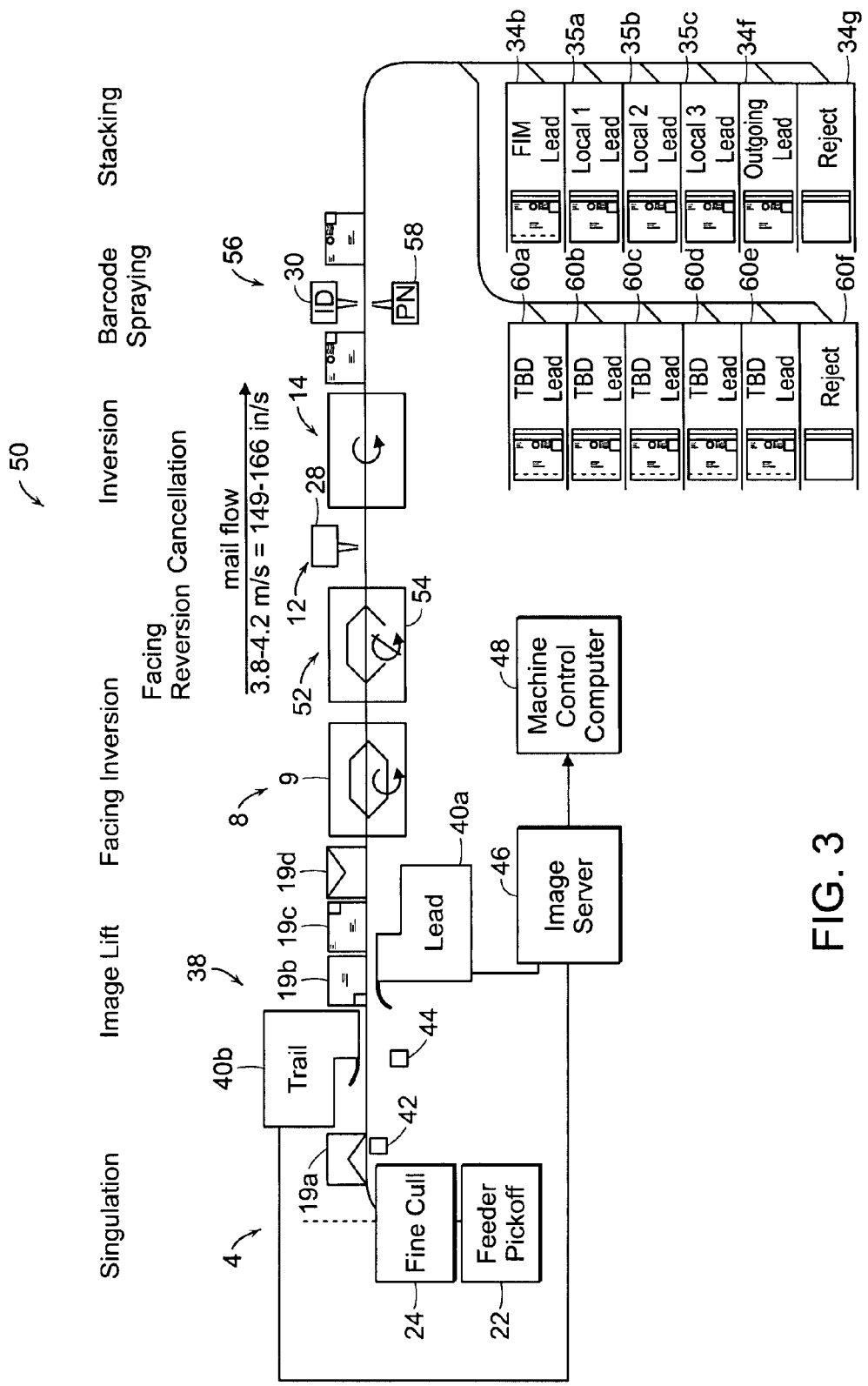
FIG. 3 is a diagram of another illustrative example a mail sorting system in which at least some embodiments of the invention may be employed.

FIG. 3 shows another illustrative example of a mail sorting system embodying various aspects of the invention. The system 50 of FIG. 3 is similar to the system 36 of FIG. 2, but there are a few significant differences. One such difference is that the system 50 includes a facing reversion stage 52 (including a reverser 54) in addition to the facing inversion stage 8. The reverser 54 may be used to ensure that all mailpieces 19 are in the same orientation before they reach the cancellation stage 12 by selectively reversing (flipping horizontally) those mailpieces that are facing opposite the desired direction. Because all mailpieces are known to have the same orientation when they reach the cancellation stage 12, it is possible to employ only a single cancellation sprayer 28 in that stage.

Another difference between the system 50 of FIG. 3 and the system 36 of FIG. 2 is that, in the system 50, a barcode spraying stage 56 includes a single ID tag sprayer 30 as well as a single POSTNET sprayer 58, whereas, in the system 30, the ID tag spraying stage 16 included a pair of ID tag sprayers 30a-b. Again, the provision of the facing reversion stage 52 enables only a single sprayer of each type to be employed, because the precise orientation of all passing mailpieces 19 is known (i.e., they are all in a lead orientation).

Because it is known that all mailpieces are in a lead orientation, there is also no need for separate bins for lead and trail mailpieces, like in the embodiment of FIG. 2. In the example shown, three separate local lead bins 35a-c are employed in lieu of the trail bins 34a, 34c, and 34e of the system 36, thus enabling a finer level of sorting of local mail by the system 50. The system 50 also includes several additional output bins 60a-f into which mail can be sorted depending on the analysis done by the image server 46 on UV and/or grayscale images accumulated by the camera assemblies 40a-b.

As illustrated by the embodiments of a mail processing system shown in FIGS. 2 and 3, it is desirable for decisions to be made as a mailpiece passes through the system. The speed and accuracy with which the information to make such decisions can be acquired and processed can impact the overall speed and accuracy of the entire mail processing system. In the illustrated embodiments, both the speed and accuracy of mail processing is improved with an improved image lifting stage 38.

Figure 4:
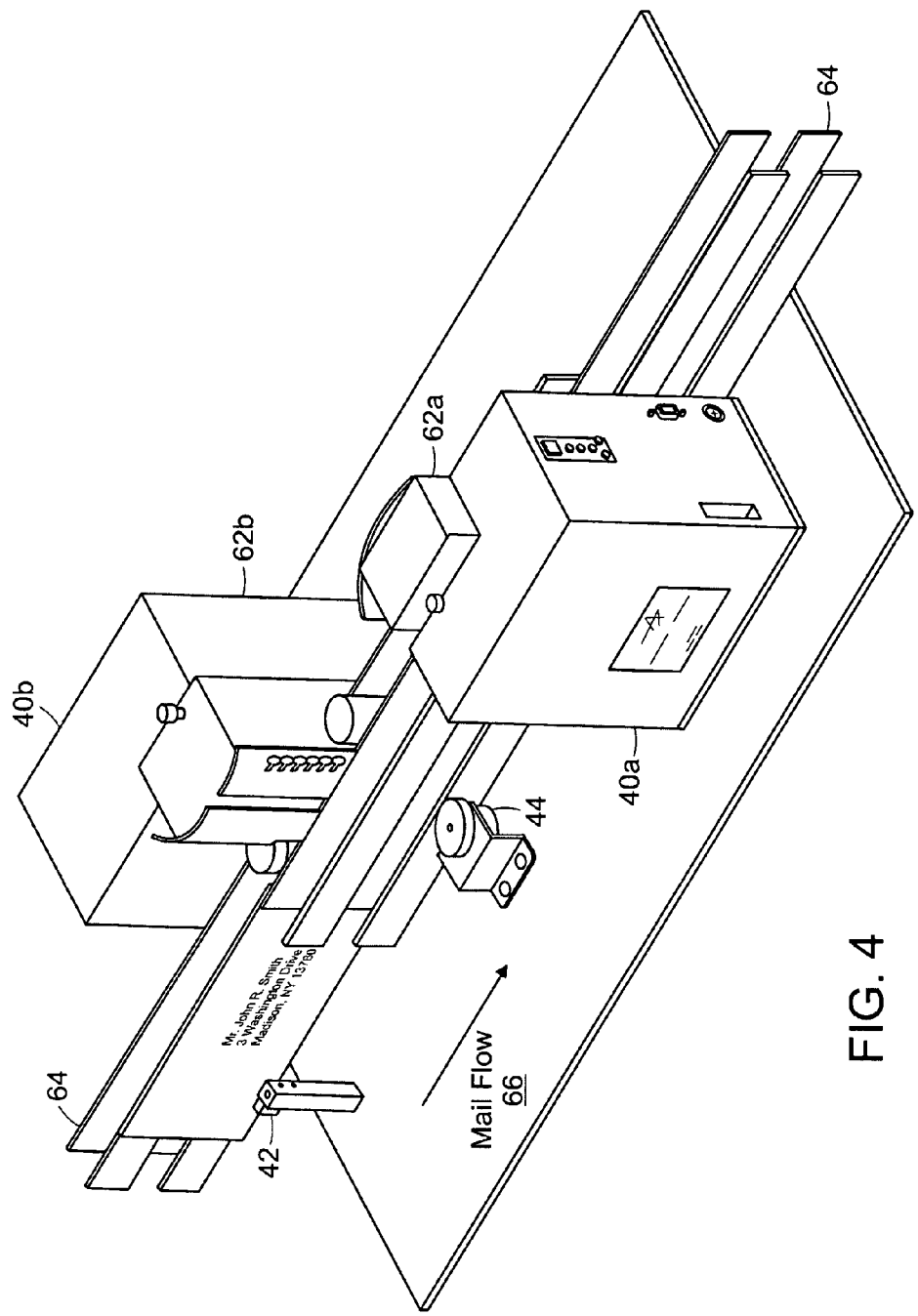
FIG. 4 shows a partial-cutaway, perspective view of the image lifting stage of the system shown in FIGS. 2 and 3.
Figure 5:
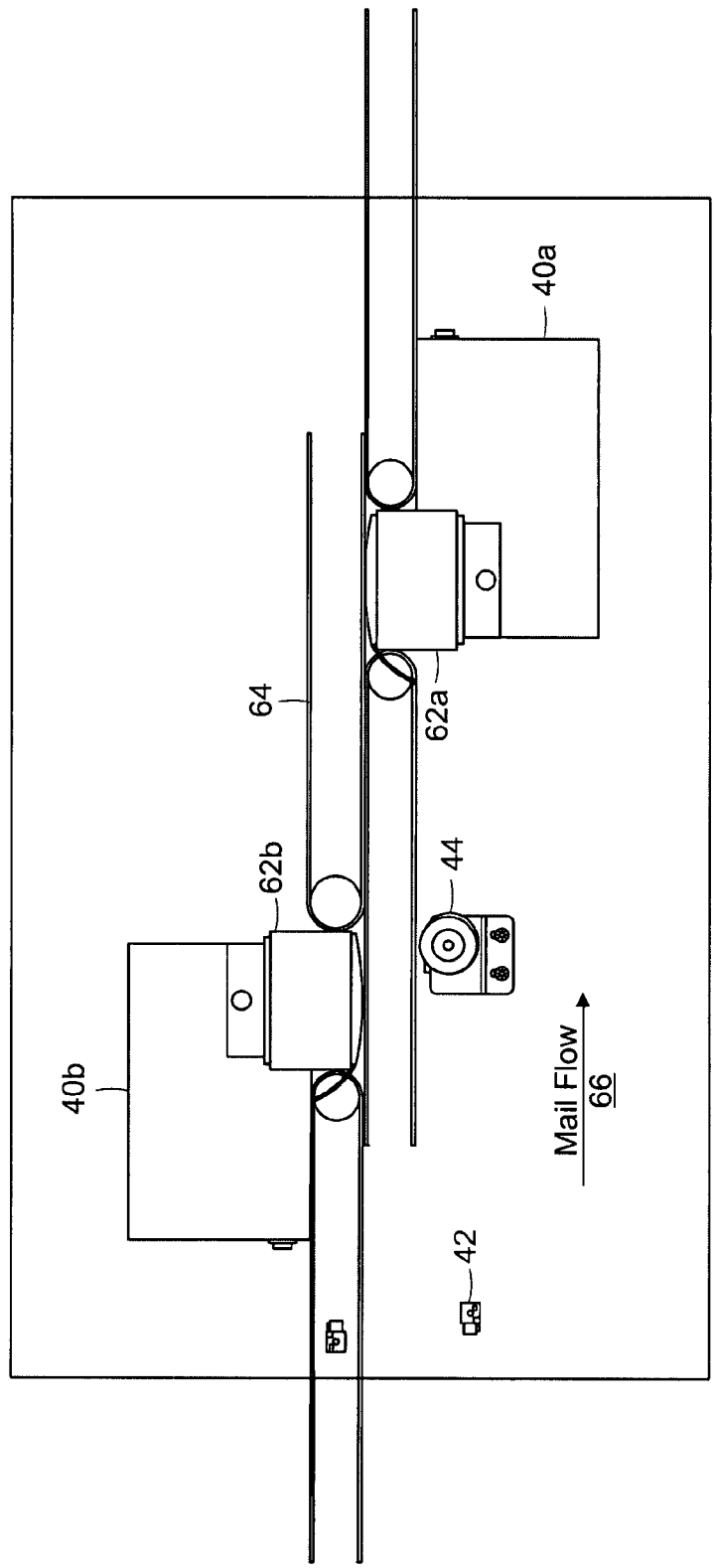
FIG. 5 shows a top view of the image lifting stage shown in FIG. 4.
Figure 6:
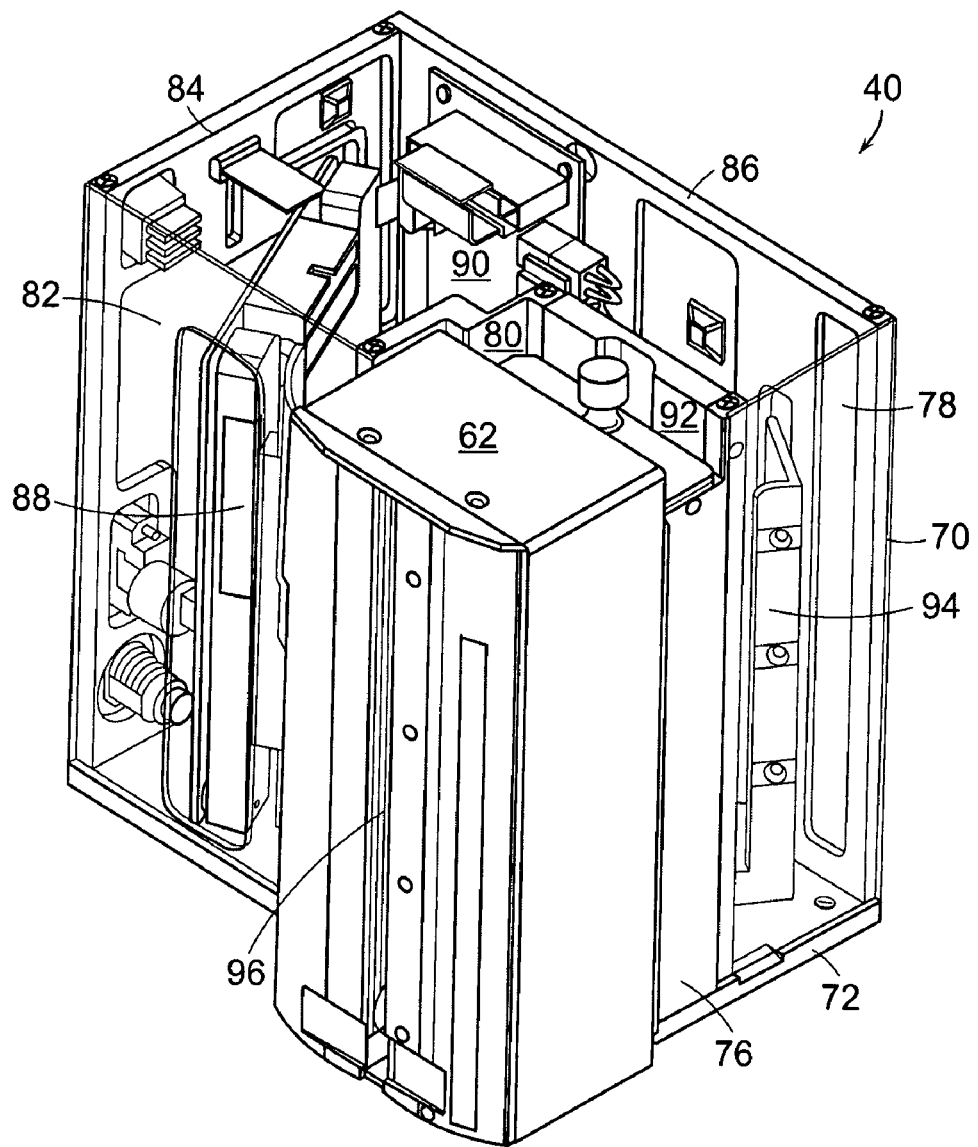
FIG. 6 shows a partial-cutaway, perspective view of one of the camera assemblies shown in FIG. 4.
Figure 7:
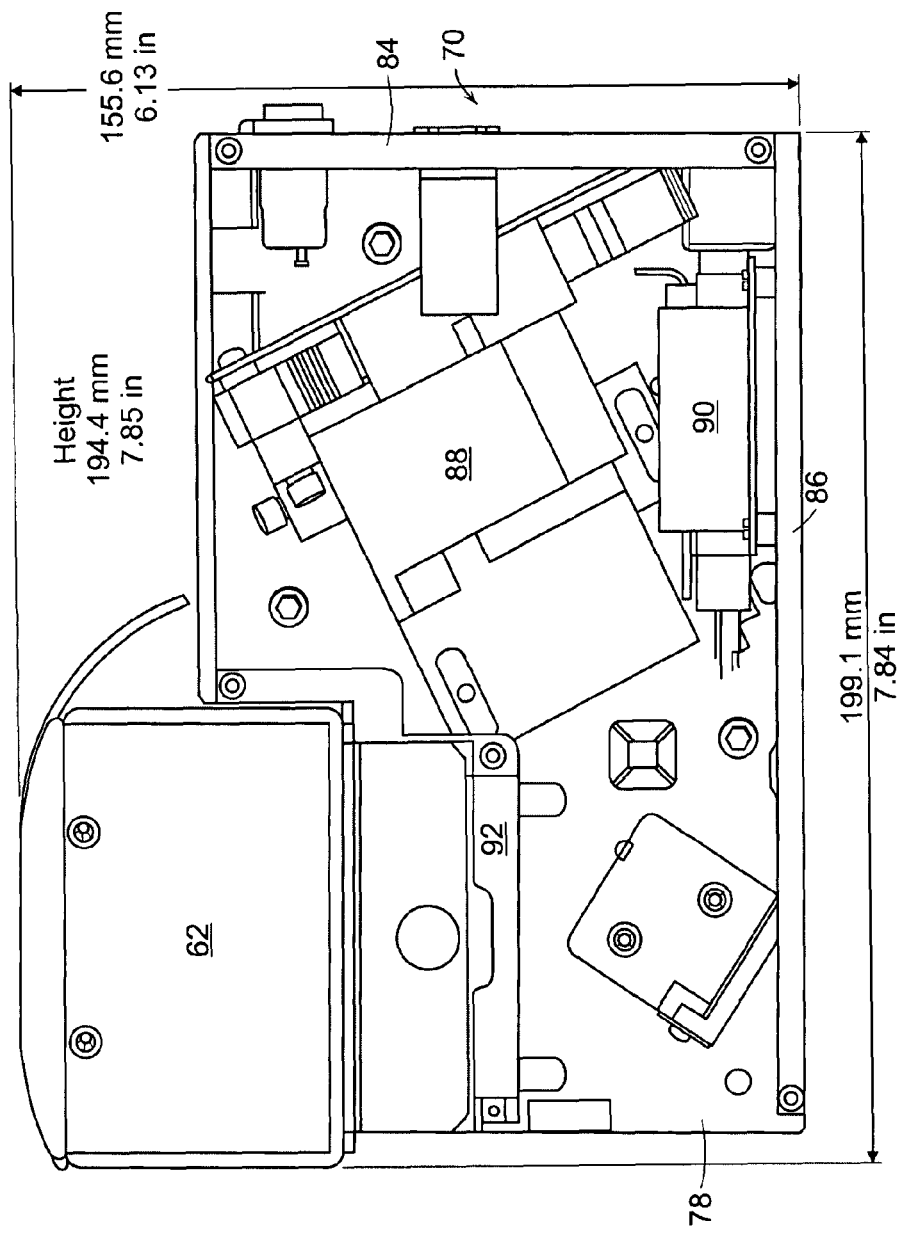
FIG. 7 shows a top view of the camera assembly shown in FIG. 6.
Figure 8:
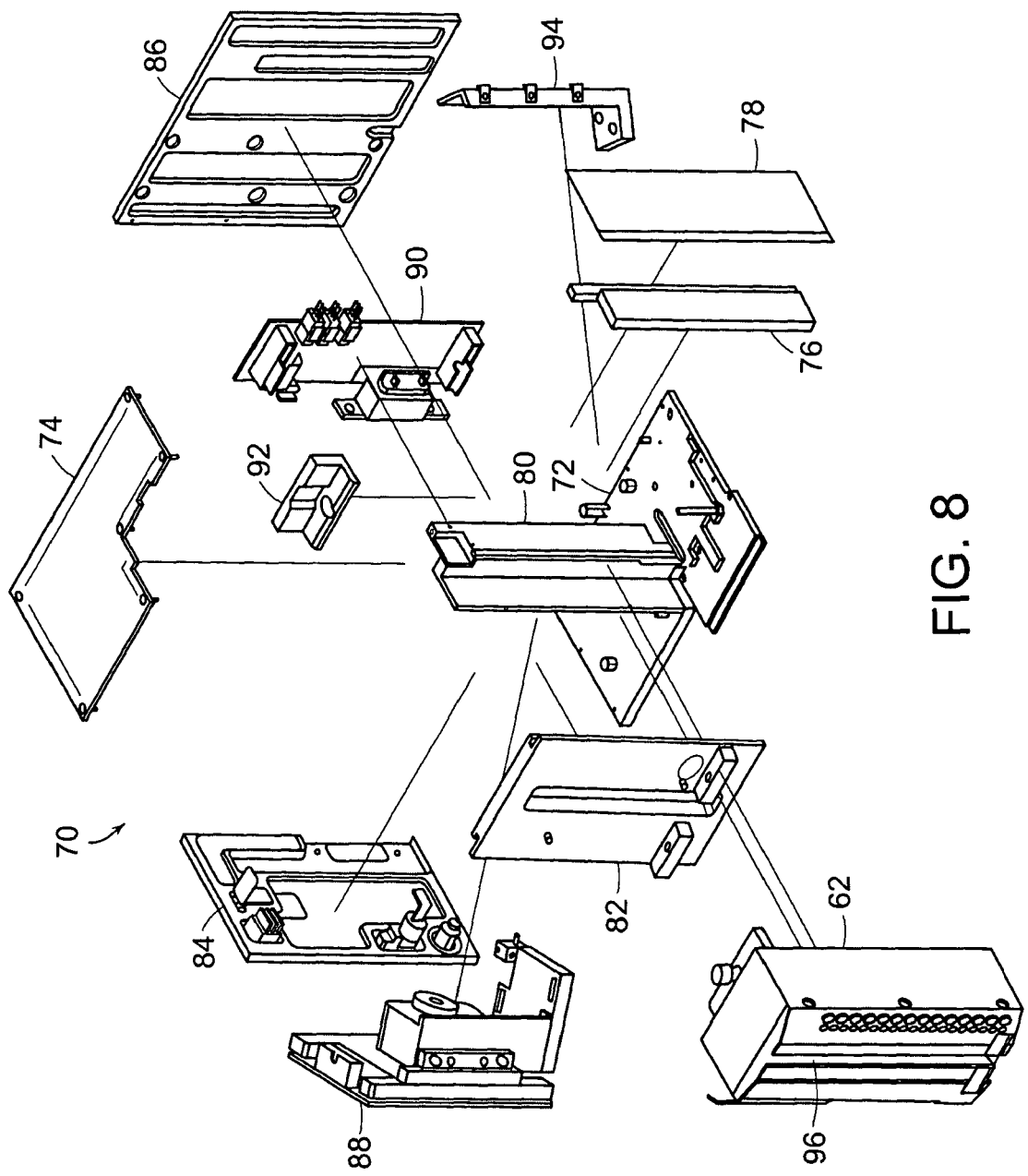
FIG. 8 shows an exploded view of the camera assembly shown in FIG. 6.

FIGS. 4 and 5 shown perspective and top views of an illustrative example of an improved image lifting stage 38 that may be used in the systems illustrated in each of FIGS. 2 and 3 or in other suitable mail processing applications. As shown, several conveyor belts 64 are arranged to move a mailpiece 19 past nose assemblies 62a-b of the camera assemblies 40a-b in the direction of the arrow 66 so that the camera assemblies 40a-b can acquire images thereof. An item presence detector 42 and belt encoder 44 are provided to allow the position of mailpieces 19 within the system to be tracked as discussed above. Ideally, the faces of the mailpieces 19 are caused to maintain physical contact with the front portions of the nose assemblies 62a-b during the imaging process so that the distance between the camera and the mailpiece is kept constant.

Several views of an illustrative embodiment of a camera assembly 40, and components thereof, are shown in FIGS. 6-10. As shown, each camera assembly 40 may comprise a nose assembly 62 detachably mounted to a base assembly 70. The base assembly 70 may comprise a housing formed of a base plate 72, top cover 74, and panels 76, 78, 80, 82, 84, 86. These panels may act as a housing to enclose the components of the assembly. These panels may additionally or alternatively serve as part of the support structure for components of the assembly.

In the example shown, enclosed within the housing are an optical bench assembly 88, a camera interface board (CIB) 90, a connector 92 for the nose assembly 62, and a mirror assembly 94. The optical bench assembly may, for example, contain an imaging array, such as a charge coupled device (CCD) (not shown), that produces lines of a grayscale image representative of the intensity of light transmitted through a slit 96 in the front of the nose assembly 62 and reflected from the mirror 94 onto the CCD of the optical bench assembly 88. Since the structure and function of the optical bench assembly 88 is essentially the same as that described in United States Application Publication No. 2006/0120563 A1, which is incorporated herein by reference in its entirety, the details of that structure will not be further described. It should also be appreciated that any of the other features or functionality of the camera assemblies, components thereof, and systems described in that published application may additionally or alternatively be employed in connection with various embodiments of the camera assemblies and overall system described herein.

The CIB 90 may provide an electrical and communications link amongst the optical bench assembly 88, the nose assembly 62, and external devices (not shown in FIGS. 6-10). Such external devices may, for example, communicate with the camera assembly components via ports on the back panel 84 (see FIG. 10). The CIB 90 may, for instance, communicate UV and/or grayscale image data to the image server 46 (see FIGS. 2 and 3) via one or more Cameralink connections. In some embodiments, moreover, the CIB 90 may receive inputs from the item presence detector 42 and belt encoder 44 (shown in FIGS. 2 and 3), and selectively control activation of illumination sources and image acquisition components so as to accurately acquire high-quality images of a proper resolution, independent of changes in belt speed. Further details concerning an illustrative apparatus and technique for controlling the illumination source based on belt speed are provided below in connection with 19-21.

Figure 9:
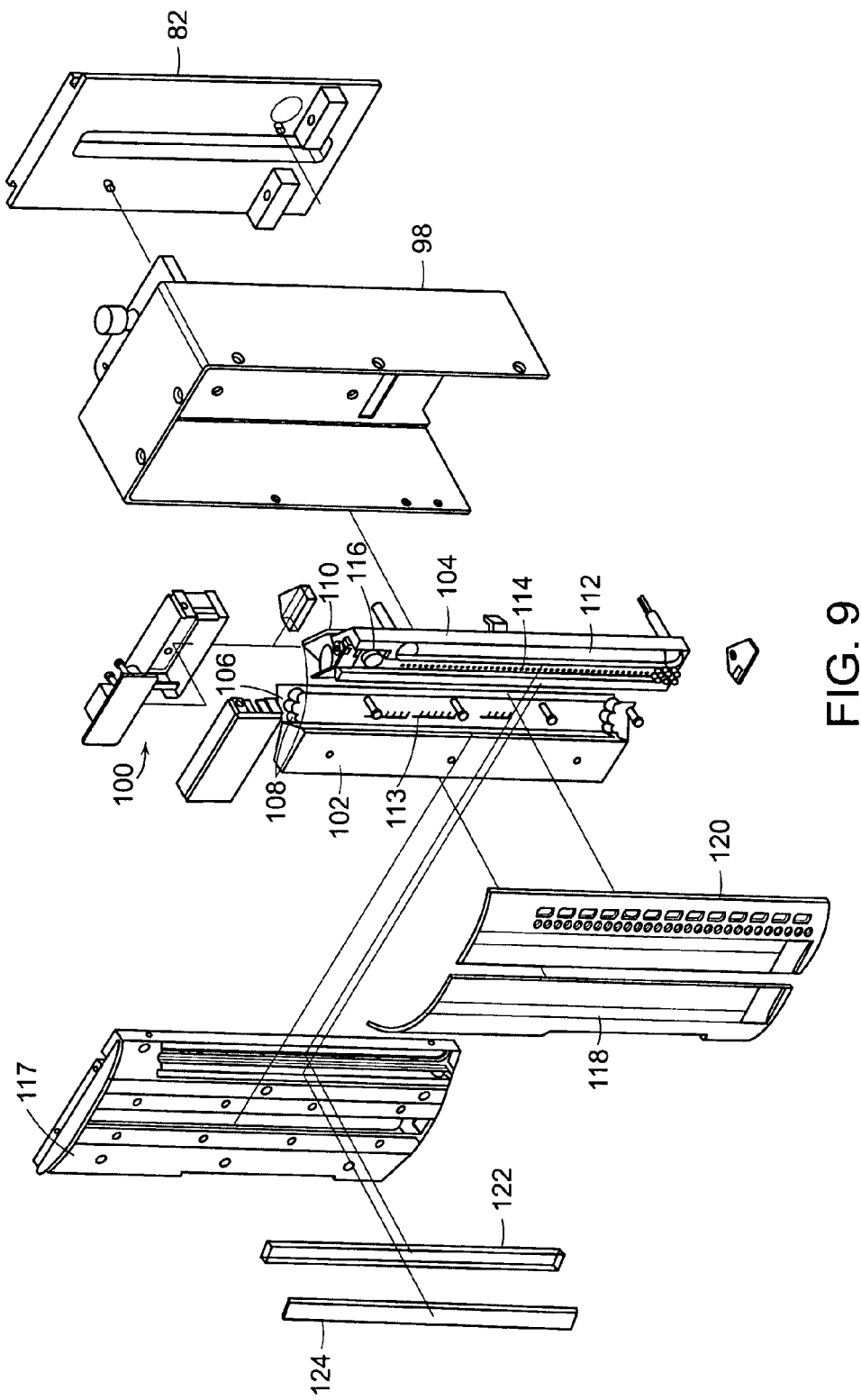
FIG. 9 shows an exploded view of the nose assembly portion of the camera assembly shown in FIG. 6.
Figure 10:
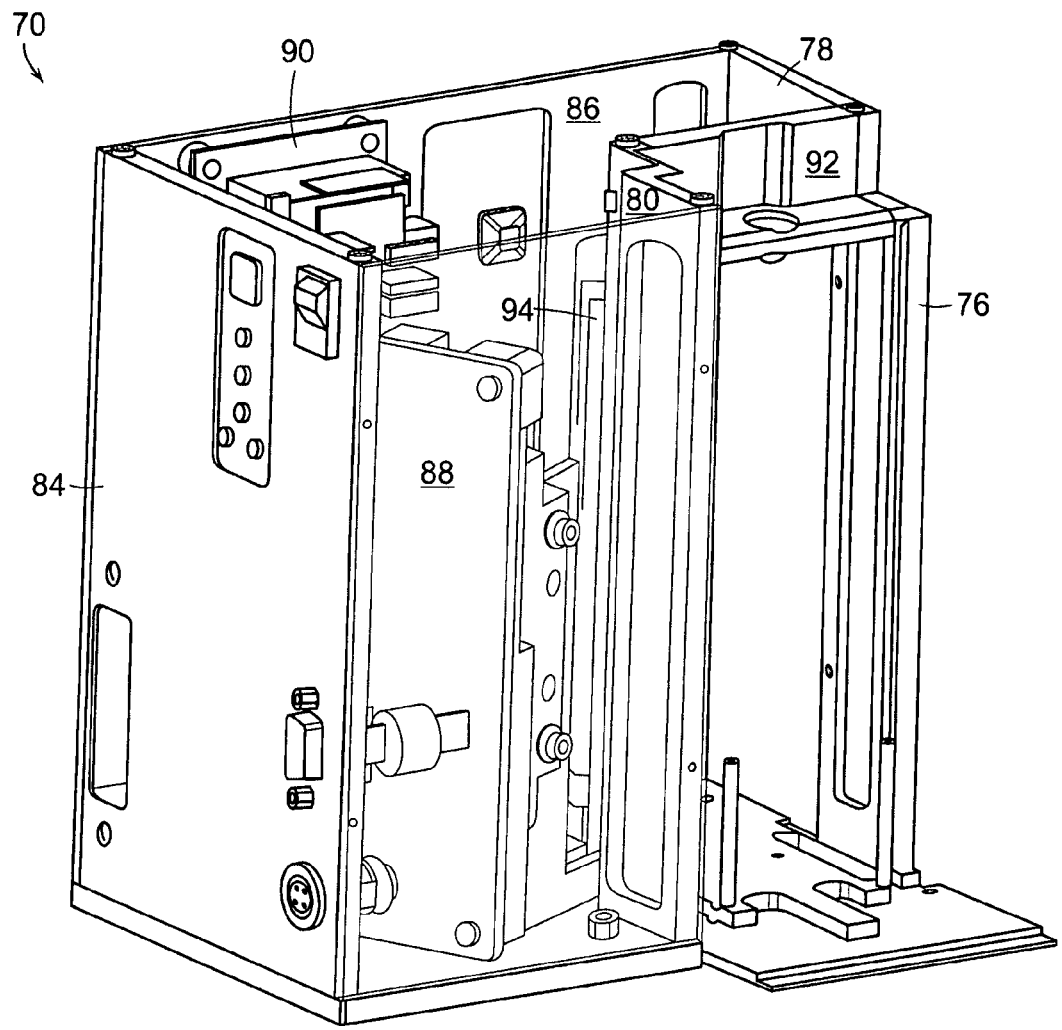
FIG. 10 shows a partial-cutaway, perspective view of the base assembly portion of the camera assembly shown in FIG. 6.

FIG. 9 shows an exploded view of an illustrative embodiment of the nose assembly 62. As shown, the nose assembly 62 may comprise a housing 98 in which are disposed a power supply 100 for a source of UV radiation 112 (discussed below), and a pair of aluminum support members 102, 104 having various components disposed thereon. In the example shown, the support member 102 supports a light source, which is here shown as an LED assembly 106. LED assembly 106 may be constructed from a circuit board or other suitable substrate having disposed thereon a large number of light emitting diodes (LEDs) 108. Likewise the support member 104 may support a similar LED assembly 110, which may also contain a circuit board and may also having a large number of LEDs 108 disposed thereon. The LED assemblies 106, 110 may be identical, but such is not required. In the illustrative embodiment shown, twenty nine rows of three LEDs 108 are disposed on each of the LED assemblies 106, 110, and a diffuser 113 is disposed in front of each group of eighty seven LEDs 108. In some embodiments, LEDs of different colors may be included amongst the white LEDs, and in some embodiments may be selectively controlled, so as to improve the response spectrum of the camera system. Additional details concerning an illustrative apparatus and technique for improving the spectrum response of a camera are provided below in connection with FIGS. 17-22.

As shown, the aluminum support member 104 may also support a source of UV radiation 112 and an array of phototransistors 114 arranged to receive light reflected from a mailpiece exposed to UV radiation from the source 112. In the example shown, the UV radiation source 112 is a florescent tube, but a set of UV generating diodes, or any other UV generating means, could alternatively be employed as the source of UV radiation 112. In some embodiments, the phototransistors 114 (or some other simple photon receptors) each contain an integrated lens, thus eliminating the need for focusing and calibration. Additional details concerning the structure and operation of the UV radiation source 112 and phototransistors 114 are provided in Application Ser. No. 60/819,188, entitled MAIL PROCESSING SYSTEM WITH LOW RESOLUTION UV IMAGING SUBSYSTEM, and filed on Jul. 7, 2006, which is incorporated herein by reference in its entirety. Moreover, details concerning the control of the UV radiation source 112 so that it is shut off during periods of non-use of the system or when the housing assembly is opened or has been compromised are provided in Application Ser. No. 60/819,414, entitled MAIL IMAGING SYSTEM WITH UV ILLUMINATION INTERRUPT, and filed on Jul. 7, 2006, which is incorporated herein by reference in its entirety. In the example shown, analog outputs of the phototransistors 114 are provided to an analog-to-digital converter (ADC) 116 where they are converted to a digital signal prior to being fed to the CIB 90 for further processing.

In the embodiment shown, the aluminum support members 102, 104 and associated components are covered by a platen 117 having a specialized configuration. The platen 117, in turn, is covered by a pair of wear plates 118, 120 also having a specialized design. Details concerning the specialized structure and function of the platen 117 and wear plates 118, 120 are provided in Application Ser. No. 60/819,217, entitled MAIL IMAGING SYSTEM WITH SECONDARY ILLUMINATION/IMAGING WINDOW, and filed on Jul. 7, 2006, which is incorporated herein by reference in its entirety.

As shown, the UV radiation source 112 and array of phototransistors 114 may each be covered by a respective filter 122, 124 to enhance the accuracy of the UV image acquisition. In the embodiment shown, performance is enhance by placing a short pass filter 122 (allowing UV radiation to pass and blocking visible illumination) in front of the UV radiation source 112, and placing a long pass filter (allowing visible radiation to pass and blocking UV radiation) in front of the array of phototransistors 114. Additional details concerning the mechanisms and techniques used to filter the light generated by the UV radiation source 112 and received at the array of phototransistors 114 are provided in Application Ser. No. 60/819,132, entitled MAIL PROCESSING SYSTEM WITH RADIATION FILTERING, and filed on Jul. 7, 2006, which is incorporated herein by reference in its entirety.

The radiation source 112 and array of phototransistors 114 may be arranged so that their operation does not interfere with the operation of optical bench assembly 88 in acquiring grayscale images. Advantageously, however, because they are acquired by components within the same camera assembly 40, the UV images and grayscale images acquired by the different components can be correlated with one another to facilitate the identification of the various markings on scanned mailpieces. Additional details concerning the acquisition and use of dual images by a camera assembly 40 and related components are provided in Application Ser. No. 60/819,137, entitled MAIL PROCESSING SYSTEM WITH DUAL CAMERA ASSEMBLY, and filed on Jul. 7, 2006, which is incorporated herein by reference in its entirety.

Figure 11:
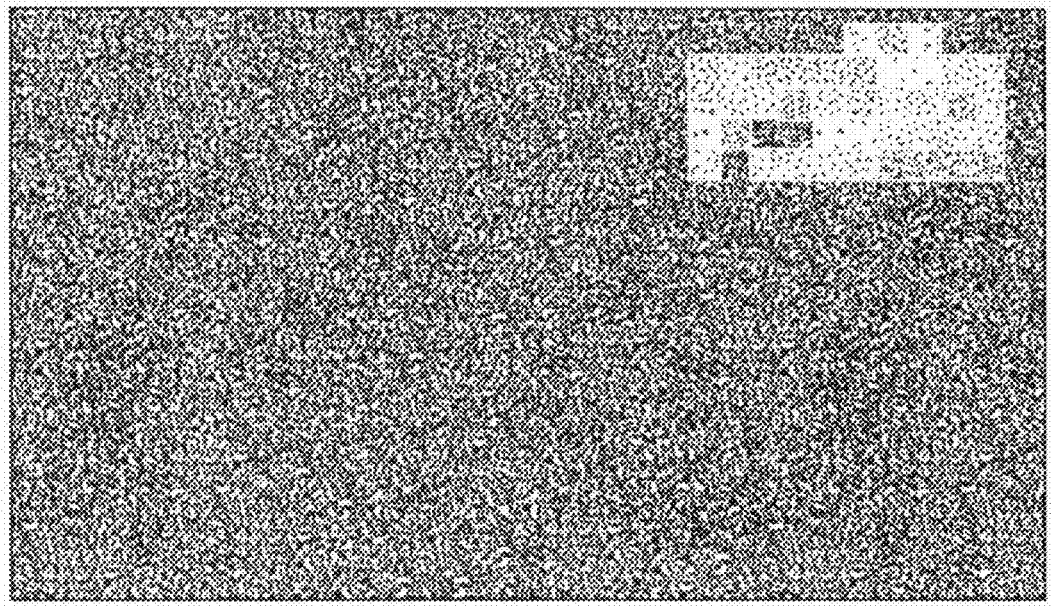
FIGS. 11 and 12 show a low-resolution UV image of a mailpiece with a UV-reactive metermark and a grayscale image of the same mailpiece, respectively, which images were taken by a camera assembly like that shown in FIG. 6.
Figure 12:
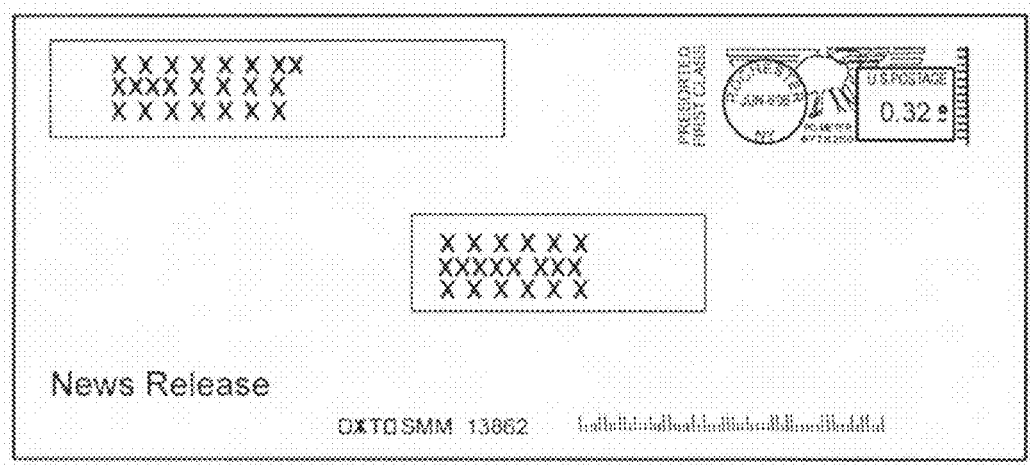
Figure 13:
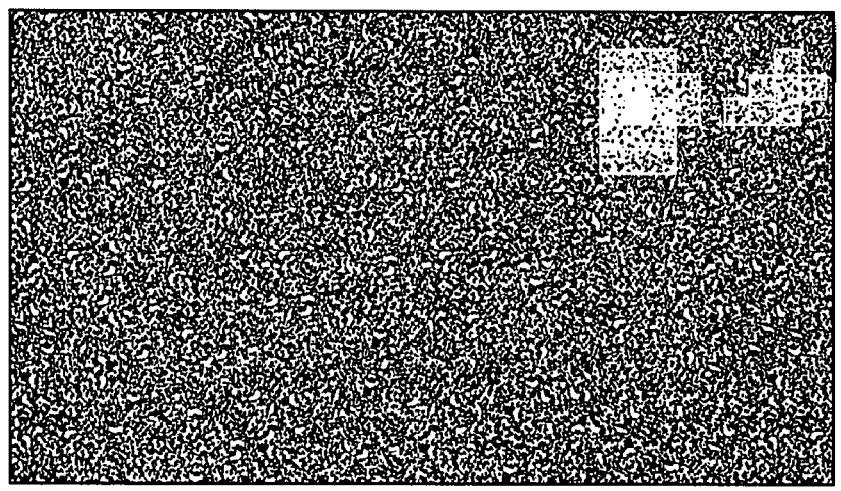
FIGS. 13 and 14 show a UV image of a mailpiece with a UV-reactive IBI barcode and a grayscale image of the same mailpiece, respectively, which images were taken by a camera assembly like that shown in FIG. 6.
Figure 14:
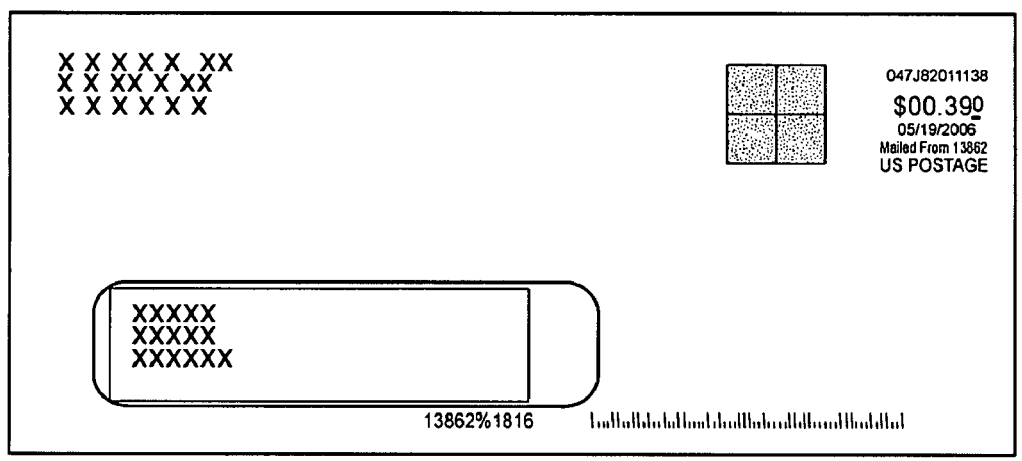
Figure 15:
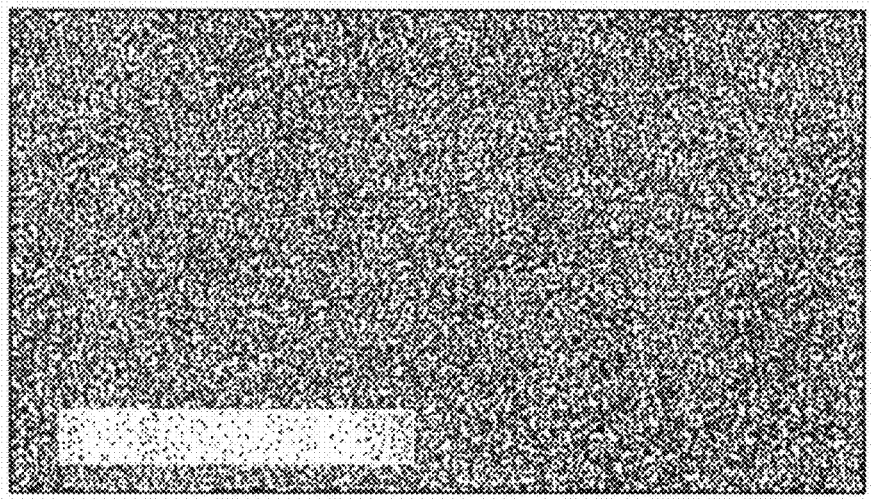
FIGS. 15 and 16 show a UV image of a mailpiece with a UV-reactive ID tag and a grayscale image of the same mailpiece, respectively, which images were taken by a camera assembly like that shown in FIG. 6.
Figure 16:
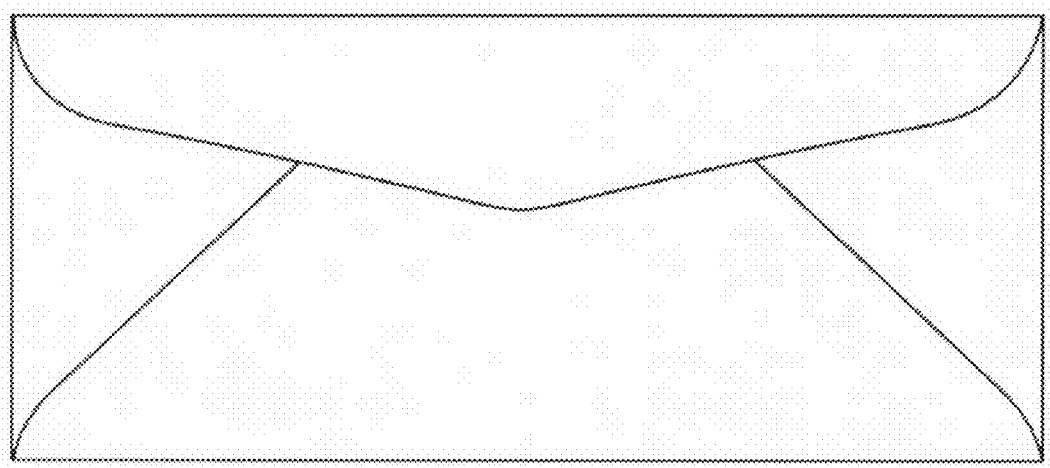

Examples of UV and grayscale images acquired of mailpieces by one of the camera assemblies 40 are shown in FIGS. 11-17, with names and addresses redacted where legible. In particular, FIG. 11 shows a low-resolution UV image of a mailpiece with a UV-reactive metermark, and FIG. 12 shows a grayscale image of the same mailpiece. Similarly, FIG. 13 shows a UV image of a mailpiece with a UV-reactive IBI barcode, and FIG. 14 shows a grayscale image of the same mailpiece. Finally, FIG. 15 shows a UV image of a mailpiece with a UV-reactive ID tag, and FIG. 16 shows a grayscale image of the same mailpiece.

Figure 18:
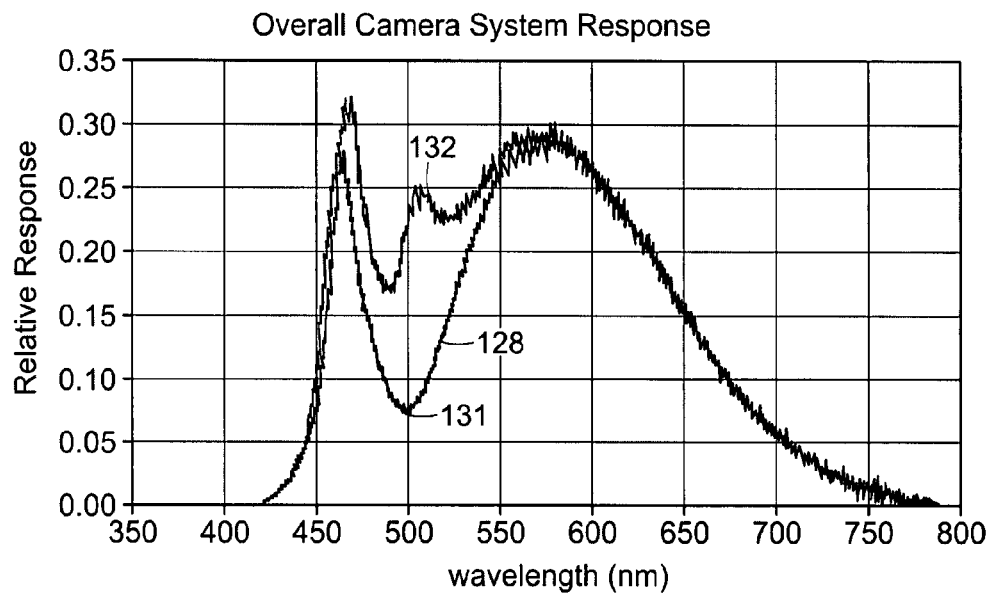
FIG. 18 is a graph comparing the overall relative response of a camera system comprising an illumination source containing only white LEDs and the overall relative response of a camera system comprising an illumination source containing both white LEDs and aqua LEDs.
Figure 17:
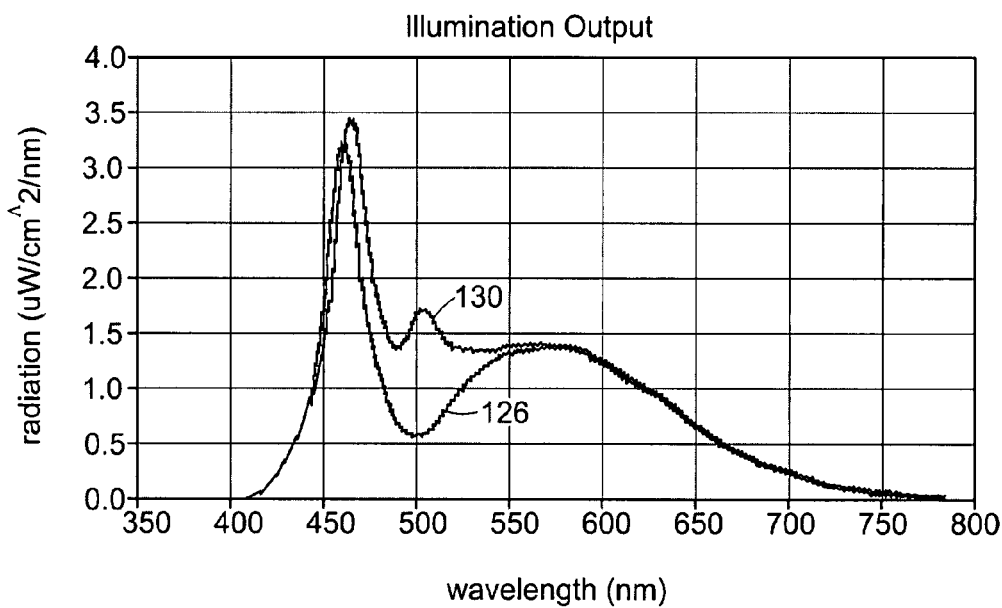
FIG. 17 is a graph comparing the measured radiation spectrum of an illumination source containing only white LEDs and the measured radiation spectrum of an illumination source containing both white and aqua LEDs.

With respect to the illumination source used for imaging, we have appreciated that a set of white LEDs alone generates a light spectrum that is less than ideal for imaging certain mailpieces. For instance, we have appreciated that a camera with such an illumination source tends to have difficulty imaging the dark green envelopes that are so ubiquitous during the holiday season. The graphs of FIGS. 17 and 18 illustrate this problem. Curve 126 in FIG. 17 represents the measured radiation spectrum of an illumination source containing only white LEDs, for wavelengths between three hundred and fifty nanometers and eight hundred nanometers. Curve 128 in FIG. 18 represents the overall response of the camera system for the same wavelength spectrum, also with an illumination source containing only white LEDs. As can be seen, the substantial dip 131 in the curve 128 can account for problems reading mailpieces of certain colors like that noted above.

With color cameras, the foregoing problem can be solved by employing color sensors and post processing images to adjust each received color independently. This solution is not applicable to grayscale cameras, however, because post-processing of colors is not possible. Some existing grayscale cameras address the problem by employing filters on the illumination or the lens. Employing such a solution, however, generally requires the generation of additional illumination, thus creating additional heat, wasting power, and decreasing life expectancy of the illumination source. Other grayscale cameras contain no mechanism for addressing the problem, but rather merely cope with it.

Figure 19:
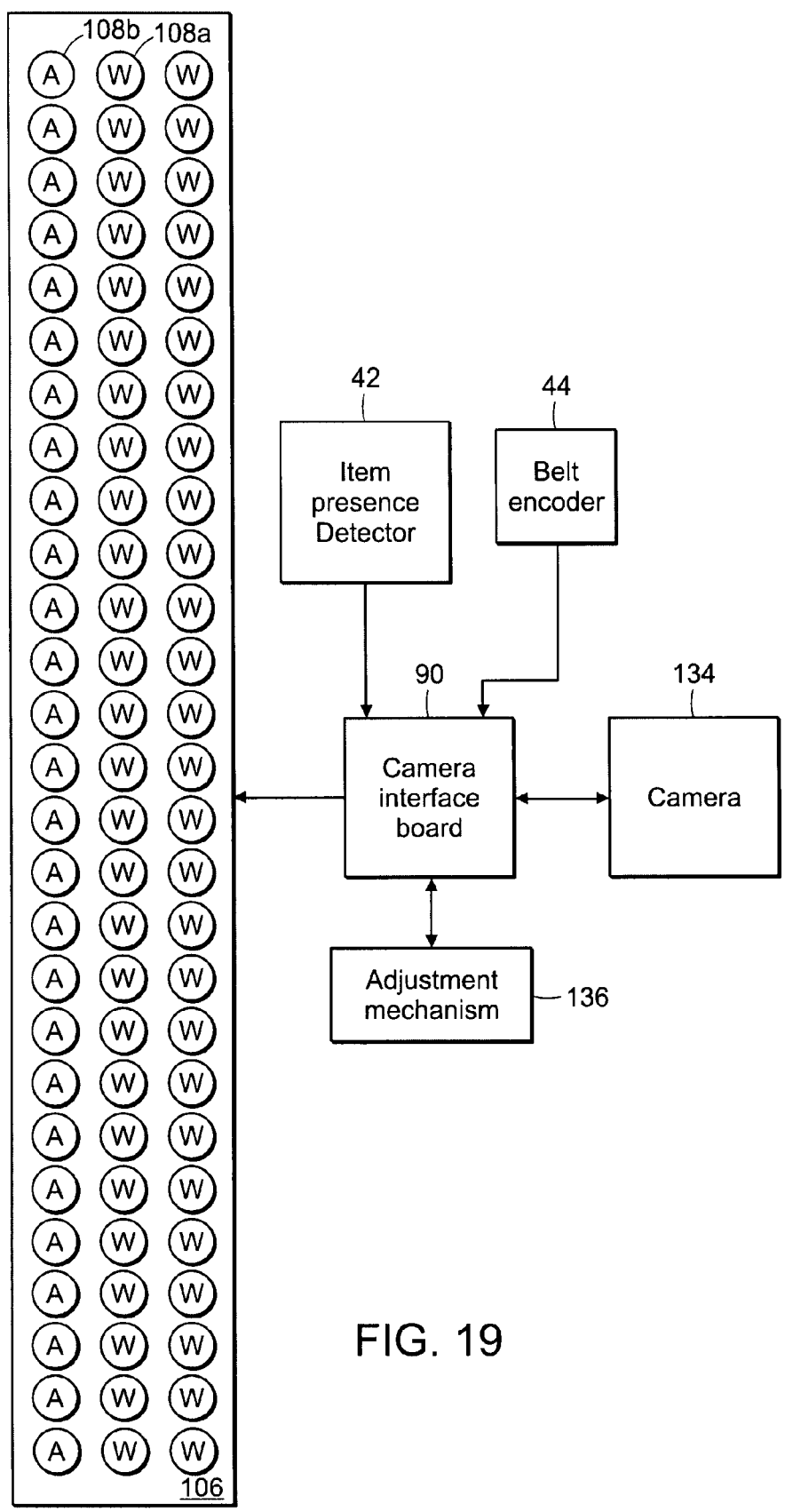
FIG. 19 is a block diagram of an example embodiment of a camera system comprising an illumination source containing both white LEDs and aqua LEDs.

FIG. 19 shows an illustrative embodiment of an illumination source that has been designed to remedy the above problem. As can be seen, in the embodiment shown, in addition to a large number of white LEDs 108a, the LED assembly 106 has disposed thereon a group of LEDs 108b of a particular color ("aqua," in the illustrated example). The use of the colored LEDs 108b in addition to the white LEDs 108a serves to smooth out the radiation spectrum of the source, as well as the response spectrum of the overall system, including both the one or more LED assemblies 106 (FIG. 9) and the remainder of the camera assembly 40.

One benefit achieved by such an implementation is illustrated by the curves 130 and 132 in FIGS. 17 and 18. Similar to the curves 126 and 128, the curve 130 in FIG. 17 represents the measured radiation spectrum of an illumination source containing both white LEDs 108a and aqua LEDs 108b, for wavelengths between three hundred and fifty nanometers (nm) and eight hundred nanometers, and the curve 132 in FIG. 18 represents the overall response of the camera system for the same wavelength spectrum, also with an illumination source containing both white LEDs 108a and aqua LEDs 108b. In the example shown, the relative power between white LEDs 108a and aqua LEDs 108b have been adjusted for specific smoothness. Likewise, in the illustrated example, the total power of white LEDs 108a and aqua LEDs 108b have been adjusted for specific imaging performance. As can be seen in FIG. 18, the curve 132 is substantially smoother throughout the visible spectrum than is the curve 128, thus allowing the camera system to yield higher quality images for a broader range of colored mailpieces. The addition of the LEDs of one or more additional colors further allows the number of white LEDs to be decreased, thus increasing the life span of the LEDs or reducing the number of white LEDs that are required.

In the illustrated embodiment, the LED assembly 106 comprises two columns of twenty seven white LEDs 108*a* and one column of twenty seven aqua colored LEDs 108*b*. The LED assembly 106 may have a similar, but perhaps a mirror image, configuration. Accordingly, in the illustrative embodiment shown, two-thirds of the one hundred and sixty two illumination LEDs 108 in the system are white, and the remaining one third of the illumination LEDs are aqua colored. It should be appreciated, however, that the number and particular types of colored LEDs that may be employed in addition to white LEDs (or any other light source) may vary depending on the application, and the invention is not limited to the particular numbers or types of LEDs shown. In alternative embodiments, for instance, one or more additional or different colored LEDs, with or without white LEDs, may be employed in any desirable quantity or ratios so as to achieve a camera response curve that is desirable for the imaging application at hand. It should also be appreciated that any number or type of LED assemblies 106 may be used to support the various types of LEDs, and the different types of LEDs may be distributed amongst different LED assemblies in any of a number of ways using and using any of a number of patterns. The invention is thus not limited to the particular number or types of LED assemblies or distribution patterns shown.

With reference to FIG. 19, as noted above, the camera interface board (CIB) 90 may be coupled between the LED assemblies 106, 110 and the camera 134, and may be responsible for controlling all operations of both components. As shown, the CIB 90 may also receive inputs from the item presence detector 42 and the belt encoder 44 (discussed above in connection with FIGS. 2 and 3), as well as from an adjustment mechanism 136. The adjustment mechanism 136 may be any device allowing an adjustment input to be provided to the CIB 90.

In some embodiments, for instance, the adjustment mechanism may be a computer that either automatically or in response to a user input periodically or occasionally generates and provides an adjustment input to the camera assembly 40 or CIB 90, or perhaps even directly to the LED assemblies or camera in alternative embodiments. In other embodiments, the adjustment mechanism may comprise one or more knobs, dials, levers or the like that enable a user to make certain adjustments to the system. As discussed in more detail below, the adjustment mechanism may be used, for example, to control parameters such as the number of LEDs of a particular type that are illuminated at a given time or the amounts of time that the different types of LEDs are illuminated in connection with the acquisition of each scan line, to optimize the performance of the imaging system for initial use, and perhaps to periodically or occasionally recalibrate the system as LEDs of different types degrade at different rates over time, or due to a change in performance characteristics of other system components.

In some embodiments, the adjustment mechanism may additionally comprise a computer display or the like that presents a user with feedback as the effect of certain adjustments on operation of the system. For example, in some embodiments, the user may be provided with a graphical display of a measured illumination output spectrum or camera response spectrum like those shown in FIG. 17 or 18, thus allowing the user to adjust control parameters for the illumination source to generate an optimally flat curve, or perhaps a curve of any other shape that might be desirable for a particular application. It is even possible that a computer may be programmed to periodically or occasionally examine such a curve and automatically make appropriate adjustments to the illumination source in response to detected changes, e.g., dips, therein.

One possible way in which the illumination source can be adjusted to alter the response curve is to control a total number of LEDs of a particular color that are illuminated at a given time. For instance, in the example configuration shown in FIG. 19, as few as one aqua LED 108*b* or as many as twenty seven aqua LEDs 108*b* could be caused to be illuminated at a given time. The white LEDs 108*a*, or any other LEDs included on the LED assemblies 106, 110, could likewise be subjected to similar control. The ratios amongst the total numbers of the different types of LEDs 108 that are employed could thus be adjusted, e.g., using the adjustment mechanism 136, so as to optimize the camera response spectrum. Moreover, in the event that different color LEDs in the assembly degrade at a different rates, the total number of one type LEDs that are illuminated may be reduced to account for a more rapid degradation rate of the others.

Additionally or alternatively, in some embodiments, the adjustment mechanism 136 or some other device or technique may be used to independently change the illumination levels of the different types of LEDs so as to selectively adjust the camera response spectrum. This may accomplished, for example, by altering the respective amounts of drive current that are applied to each different type of LED. Using such a technique, each type of LED may, for instance, be illuminated at any selected level from 0% to 100% of maximum power. Accordingly, in the example configuration of FIG. 19, one or more of the white LEDs 108*a* may be illuminated at a first selected level from 0% to 100% of maximum power, and one or more of the aqua LEDs 108*b* may be illuminated at a second selected level from 0% to 100% of maximum power. Once the optimum relative power between the aqua LEDs 108*b* and the white LEDs 108*a* is determined, the optimum total power may be determined.

It should be appreciated that, in some embodiments, the LEDs of a particular type that are energized need not all be energized identically. For instance, in the example configuration of FIG. 19, different ones of the white LEDs 108*a* along the vertical axis may be energized at different levels. Likewise, different ones of the aqua LEDs 108*b* in that example may additionally or alternatively be energized at different levels. Such non-uniform energizing of the LEDs may, at least for some applications, allow for more consistent illumination levels along the entire width of the mailpiece being imaged.

Additionally or alternatively, in some embodiments (as discussed in more detail below), the amounts of time the different types of LEDs are caused to be illuminated in connection with the acquisition of each scan line may be altered by the adjustment mechanism 136 so as to selectively adjust the camera response spectrum.

It is known that an illumination source for a camera may be strobed so as to extend its lifespan. We have appreciated, however, that strobing an illumination source asynchronously with line scanning can cause numerous problems resulting from variations in illumination across lines. For instance, asynchronous strobing can result in an uneven image with bands perpendicular to or parallel to the scan lines, defocusing on the image perpendicular to the scan lines, inconsistent illumination with variation in the rate of line scanning, or other undesirable artifacts in the image. In some camera systems, this problem is alleviated by strobing the illumination source at a much higher rate than the line scanning so as to minimize variation in illumination based on timing.

In mail processing systems such as those described above, where mail is typically moved past a fixed camera, the conveyor system moving the mail may undergo variations in speed from imperfections and wear in mechanical system such as belts, pulleys, pullers, and motors. Some significant variation may even occur over the short term, e.g., over a just a few scan lines. When asynchronous illumination is employed in such a system, the amount of illumination provided must be varied with speed, which requires the precise measurement of speed so that the illumination system can compensate for changes in it.

We have appreciated that this problem may instead be addressed by synchronizing the strobing of the illumination source to the acquisition of scan lines, and providing a constant amount of illumination energy output for each scan line regardless of the rate at which such scan lines are being acquired. As a result, variation in images due to variation in scan line rate can be reduced significantly.

As shown in FIG. 19, the CIB 90 may receive inputs from the item presence detector 42 and belt encoder 44 discussed above in connection with FIGS. 2 and 3. Since the item presence detector 42 is a known distance upstream of each of the camera assemblies 40a-b, and the belt encoder 44 outputs a specific number of pulses per unit distance traveled by the conveyor that transports mailpieces 19 past the camera assemblies 40a-b, each CIB 90 can determine precisely when each mailpiece will be physically present in front of the slit 96 of its camera assembly 40. Each CIB 90 may thus determine a pulse from the belt encoder 44 on which a first scan line of a mailpiece should begin, and may also determine the precise number of scan lines that should be taken of a mailpiece to image it fully. To maximize the life span of the illumination source, it may be controlled so that it is activated only when a mailpiece is in front of the slit 96 for imaging.

Figure 20:
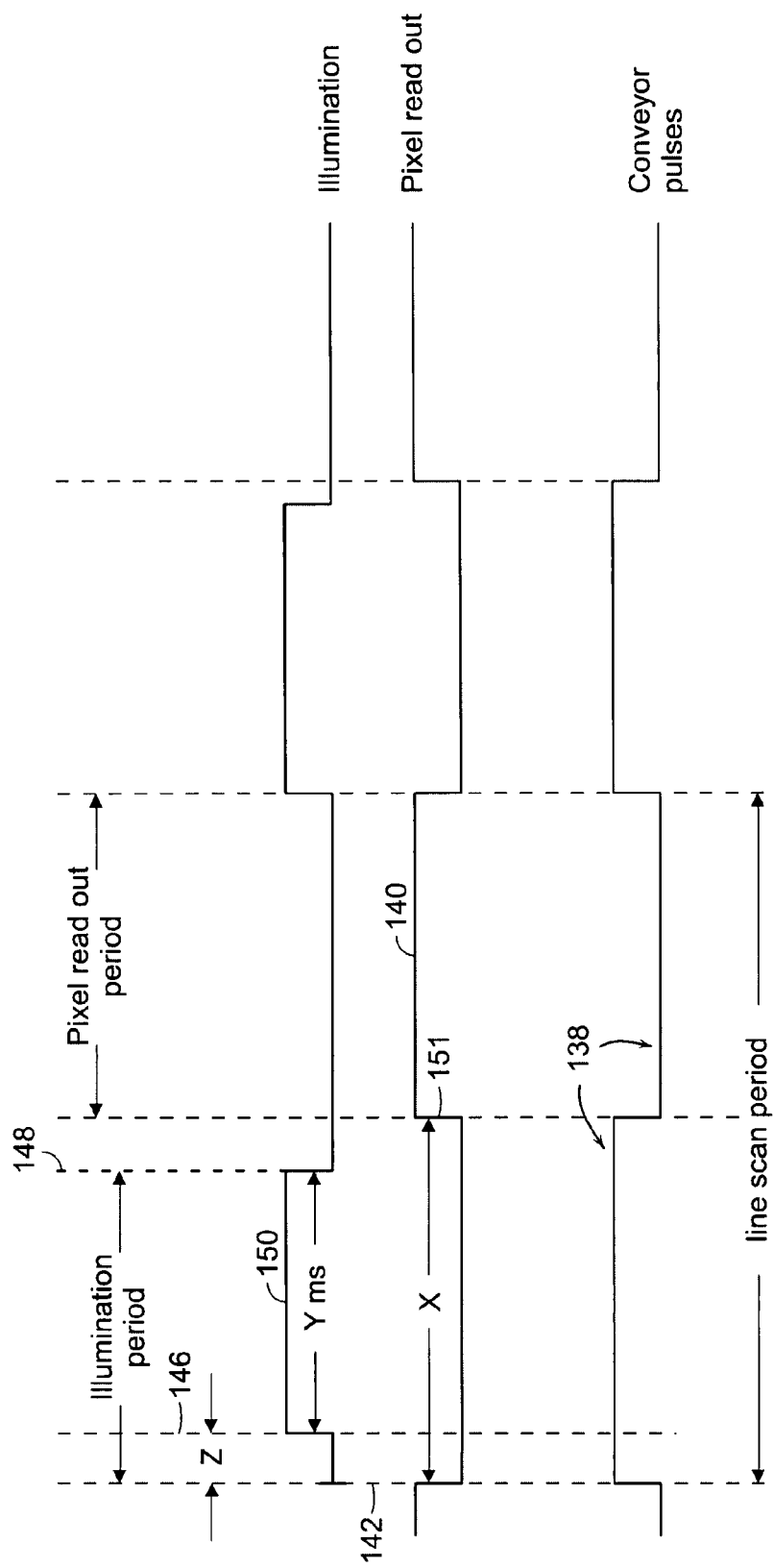
FIG. 20 is a timing diagram illustrating how an illumination source of a line scanning camera may be controlled.

Depending on the number of pulses per unit length of the conveyor travel that are output by the belt encoder 44 and the desired resolution of the acquired image, the CIB 90 may control activation of the LED assembly 106 and the camera 134 so as to acquire a respective scan line of an image during a scan period comprising a single pulse cycle, or several pulse cycles, or some fraction or multiple thereof. FIG. 20 is a timing diagram illustrating an example of a scenario in which each line scan period comprises a single pulse cycle 138 of the belt encoder 44. If, in such an example, the belt encoder 44 were to output two hundred fifty-six pulses for each one inch of travel of the conveyor, then the system would acquire two hundred fifty-six scan lines for each one inch a mailpiece traveled during imaging. It should be appreciated, of course, that the particular number of pulses, scan lines, and pixels produced or acquired per inch may vary from application to application, and the example provided is not intended to be limiting in any way.

In the illustrative example of FIG. 20, pixels of an imaging array are read out during pixel read out periods 140 that begin a certain period "X" after a starting time 142 of each line scan period, and illumination periods 150 of the illumination source (e.g., LED assemblies 106, 110) terminate just prior to starting points 151 of the pixel read out periods 140. In the example shown, the starting points 142 of the line scan periods and the starting points 151 of the pixel read out periods 140 correspond to transitions in the pulses 138, but may be tied to the pulses 138 in any of a number of alternative ways and the invention is not limited to the particular timing technique shown. As shown, the illumination source may be activated beginning at a time 146, which is a particular period "Z" following the starting time 142 of the line scan period, and may be deactivated at a time 148, which may be a set time period ("Y" milliseconds (ms)) following the starting time 146. The period "Z" may, for instance, be a set period of time or a particular fraction of a complete pulse cycle 138, or may even be equal to zero. The illumination source is thus activated (without strobing) between the times 146 and 148 of each line scan period.

By tying the activation of the illumination source to the output of the belt encoder 44 in this fashion, the "on" periods of the illumination source may be correlated precisely with the acquisition of scan lines. In addition, since in such an embodiment the illumination source is activated for a set period of time ("Y" ms) in connection with the acquisition of each scan line, which set period is not tied to conveyor speed, the illumination source will emit the same amount of energy during each line scan period regardless of conveyor speed, thus enabling higher quality images to be acquired.

Figure 21:
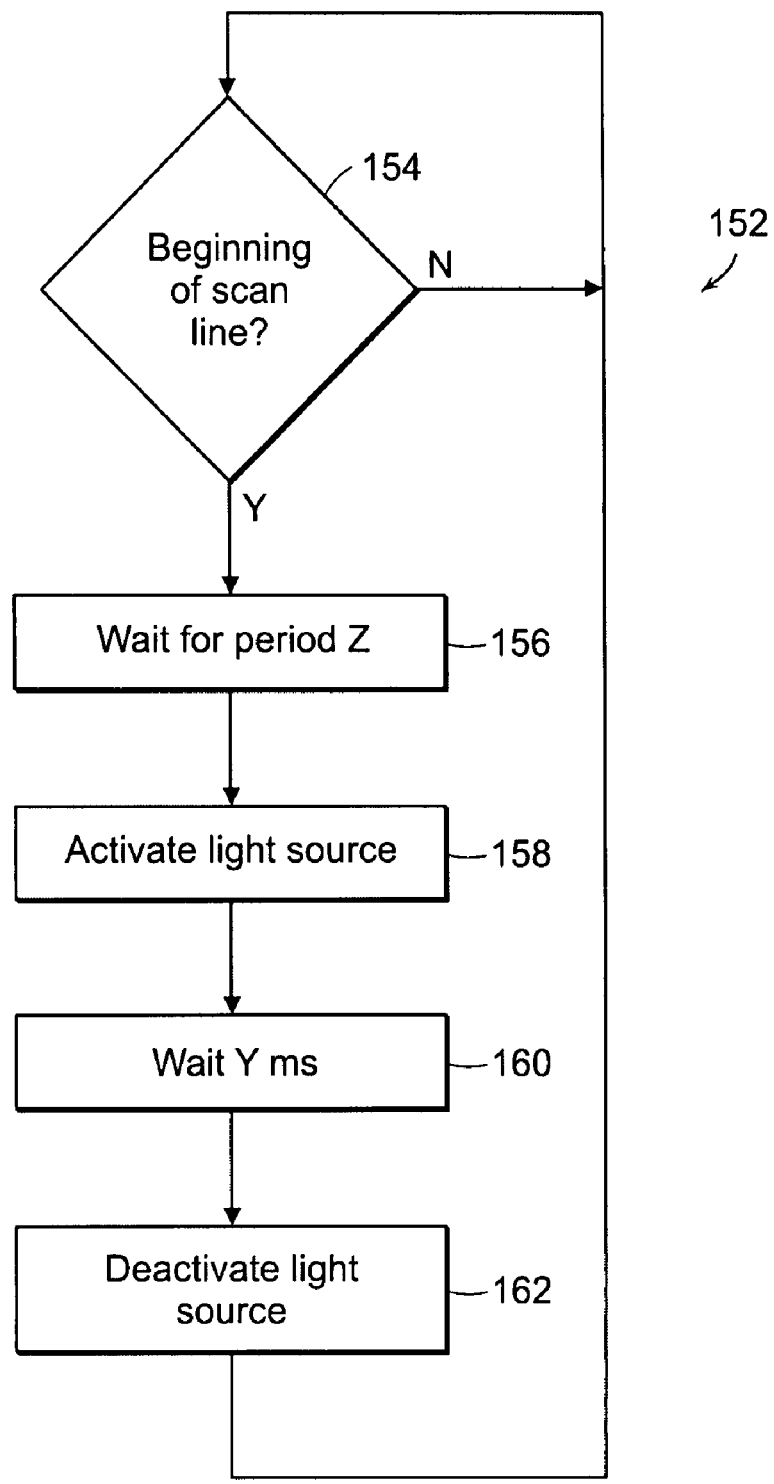
FIG. 21 is a flow chart illustrating an example of a routine for controlling the illumination source of a line scanning camera.

FIG. 21 is a flow chart showing an example of a routine 152 that may, for example, be executed by a controller (not shown) on the CIB 90 based on the content of firmware or software to which it has access, so as to achieve the timing and control of the illumination source illustrated in FIG. 20. As shown, the routine 152 begins at a step 154, during which it is determined, e.g., based upon the output of the item presence detector 42 and belt encoder 44, whether it is the beginning of a line scan period for a mailpiece 19. When, at the step 154, it is determined that it is indeed the beginning of a scan line period, the routine 152 proceeds to steps 156-162, during which, the routine waits for a period "Z" (step 156), activates the illumination source (step 158), waits for "Y" milliseconds (ms) (step 160), and then deactivates the illumination source (step 162). Following the step 162, the routine 152 returns to the step 154, and awaits the beginning of another scan line period.

It should be appreciated that, in alternative embodiments, the illumination periods 150 of the illumination source may be shifted so that the ending points 148 correspond to particular transitions in the conveyor pulses 138, and the beginning points 146 may be made to begin a set time period ("Y" ms) before such transitions. In such embodiments, the pixel read out periods 140 could additionally be shifted so as to begin some period after the ending points 148, if desired. It should further be appreciated that, in some embodiments, the illumination periods 150 of the illumination source may be divided into several shorter periods within the periods 150.

The particular timing and duration of each of the image read out period 140 and the illumination period 150 may be selectively controlled and optimized for any particular application or purpose. In some embodiments, for example, the duration "Y" of the illumination period may be altered so as to control system performance, or to account for the degradation in LEDs 108 or other system components. For example, as certain illumination LEDs age and thereby degrade, the illumination period "Y" may be extended so as to boost the total light power output for each line scan cycle. Moreover, as noted above, in embodiments like that shown in FIG. 19 in which two or more types or colors of LEDs 108a, 108b are employed, the illumination periods for respective LED types or colors can be made different or selectively adjusted (e.g., using the adjustment mechanism 136) with respect to one another so as to optimize the camera response spectrum for the application at hand, or to recalibrate the system to account for the disparate degradation rates of the different types of LEDs 108a, 108b. Such periods may be adjusted for all of the LEDs of a particular type in the array, or only for one or more selected ones of them.

It should be appreciated that a similar approach to controlling the timing of image acquisition and lighting source illumination could additionally or alternatively be employed in connection with the acquisition of UV images as discussed above, or in any other circumstance in which items to be scanned are moved past a line scanner, or vice versa, and the invention is not limited to the particular embodiments or applications discussed above.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A system, comprising:
    a mail sorting system; and
    a camera system, comprising:
        a support structure;
        a camera supported by the support structure, wherein the camera is configured and arranged to image mailpieces to facilitate sorting thereof;
        a group of light emitting diodes (LEDs) supported by the support structure and configured and arranged to illuminate mailpieces imaged by the camera, the group of LEDs comprising a first plurality of LEDs of a first type that emit light, with a first spectrum profile and a second plurality of LEDs of a second type that emit light with a second spectrum profile that is substantially different than the first spectrum profile; and
        an adjustment mechanism configured and arranged to adjust, independent of the nature of at least some individual mailpieces being imaged by the camera system, the relative amounts of illumination energy generated by the first and second pluralities of LEDs during scan cycles of the camera so as to optimize a spectral response of the camera system during said scan cycles.

2. The system of claim 1, wherein:
    each of the first plurality of LEDs comprises a white LED, and
    each of the second plurality of LEDs comprises a colored LED.

3. A camera system, comprising:
    a support structure;
    a camera supported by the support structure;
    a group of light emitting diodes (LEDs) supported by the support structure and configured and arranged to illuminate an object imaged by the camera, the group of LEDs comprising a first plurality of LEDs of a first type that emit light with a first spectrum profile and a second plurality of LEDs of a second type that emit light with a second spectrum profile that is substantially different than the first spectrum profile; and
    an adjustment mechanism configured and arranged to adjust, independent of the nature of at least some individual objects being imaged by the camera system, the relative amounts of illumination energy generated by the first and second pluralities of LEDs during scan cycles of the camera so as to optimize a spectral response of the camera system during said scan cycles;
    wherein each of the first plurality of LEDs comprises a white LED, and each of the second plurality of LEDs comprises an aqua LED.

4. The system of claim 1, wherein the adjustment mechanism is further configured and arranged to selectively deactivate, independent of the nature of at least some individual objects being imaged by the camera system, selected ones of at least one of the first and second pluralities of LEDs during the scan cycles of the camera.

5. The system of claim 1, wherein the adjustment mechanism is further configured and arranged to selectively alter, independent of the nature of at least some individual objects being imaged by the camera system, an amount of time at least one of the first plurality of LEDs is illuminated during the scan cycles of the camera without altering an amount of time at least one of the second plurality of LEDs is illuminated during the scan cycles of the camera in the same manner.

6. The system of claim 1, wherein the camera comprises a grayscale camera.

7. The system of claim 1, wherein the camera comprises a line scanning camera.

8. The system of claim 1, wherein the group of LEDs further comprises a third plurality of LEDs of a third type that emit light with a third spectrum profile that is substantially different than each of the first spectrum profile and the second spectrum profile.

9. The system of claim 1, further comprising an additional camera system comprising:
    an additional support structure;
    an additional camera supported by the at least one additional support structure, the camera and the additional camera being configured and arranged to image opposite sides of the mailpieces processed by the mail sorting system;
    an additional group of light emitting diodes (LEDs) supported by the additional support structure and configured and arranged to illuminate the mailpieces imaged by the additional camera, the additional group of LEDs comprising a third plurality of LEDs of the first type that emit light with the first spectrum profile and a fourth plurality of LEDs of the second type that emit light with the second spectrum profile; and
    wherein the adjustment mechanism is further configured and arranged to adjust, independent of the nature of at least some individual objects being imaged by the additional camera system, the relative amounts of illumination energy generated by the third and fourth pluralities of LEDs during scan cycles of the additional camera so as to optimize a spectral response of the additional camera system during said scan cycles.

10. A method, comprising steps of:
    (a) energizing a group of LEDs included in a camera system to generate illumination having a particular spectrum profile, the group of LEDs comprising a first plurality of LEDs of a first type that emit light with a first spectrum profile and a second plurality of LEDs of a second type that emit light with a second spectrum profile that is substantially different than the first spectrum profile;
    (b) moving mailpieces past a group of photodetectors;
    (c) detecting at least some of the illumination reflected from the mailpieces with the group of photodetectors to generate images of the mailpieces;
    (d) analyzing the images of the mailpieces to facilitate the sorting thereof; and
    (e) adjusting, independent of the nature of at least some individual mailpieces being imaged by the camera system, the relative amounts of illumination energy generated by the first and second pluralities of LEDs during scan cycles of the camera system so as to optimize a spectral response of the camera system during said scan cycles.

11. The method of claim 10, wherein the step (e) comprises selectively deactivating, independent of the nature of at least some individual objects being imaged by the camera system, selected ones of at least one of the first and second pluralities of LEDs during the scan cycles of the camera system.

12. The method of claim 10, wherein the step (e) comprises altering, independent of the nature of at least some individual objects being imaged by the camera system, an amount of time at least one of the first plurality of LEDs is illuminated during the scan cycles of the camera system without altering an amount of time at least one of the second plurality of LEDs is illuminated during the scan cycles of the camera system in the same manner.

13. The method of claim 10, wherein:
the step (e) is performed after performing the steps (a), (b), (c), and (d), and
wherein the step (e) comprises adjusting the relative amounts of illumination energy generated by first and second pluralities of LEDs during the scan cycles of the camera system to account for disparate degradation rates of the LEDs of the first type and the LEDs of the second type.

14. The method of claim 10, wherein the step (e) comprises steps of:
evaluating the spectrum response of the camera system; and
adjusting the relative amounts of illumination energy generated by the first and second pluralities of LEDs during the scan cycles of the camera system upon identification of a change in the spectrum response of the camera system.

15. The method of claim 10, wherein the group of LEDs further comprises a third plurality of LEDs of a third type that emit light with a third spectrum profile that is substantially different than each of the first spectrum profile and the second spectrum profile.

16. A camera system, comprising:
a support structure;
a camera supported by the support structure and configured and arranged to image mailpieces being processed by a mail sorting system;
a group of light emitting diodes (LEDs) supported by the support structure and configured and arranged to illuminate the mailpieces being imaged by the camera, the group of LEDs comprising at least one first LED of a first type that emits light with a first spectrum profile and at least one second LED of a second type that emits light with a second spectrum profile that is substantially different than the first spectrum profile;
at least one processor configured and arranged to process image data obtained by the camera to facilitate the processing of the mailpieces by the mail sorting system; and
an adjustment mechanism configured and arranged to adjust, independent of the nature of at least some individual mailpieces being imaged by the camera system, the relative amounts of illumination energy generated by the at least one first LED and the at least one second LED during scan cycles of the camera so as to optimize a spectral response of the camera system during said scan cycles.

17. The camera system of claim 16, wherein the adjustment mechanism comprises means for adjusting the relative amounts of illumination energy generated by the at least one first LED and the at least one second LED during the scan cycles of the camera.

18. The camera system of claim 16, wherein the camera comprises a grayscale camera.

19. The camera system of claim 16, wherein the camera comprises a line scanning camera.

20. The camera system of claim 16, wherein the group of LEDs further comprises at least one third LED of a third type that emits light with a third spectrum profile that is substantially different than each of the first spectrum profile and the second spectrum profile.

21. The camera system of claim 1, wherein the group of LEDs is further configured and arranged such that, during at least a portion of each of said scan cycles, one or more LEDs included in the first plurality of LEDs are energized at the same time one or more LEDs included in the second plurality of LEDs are energized.

22. The camera system of claim 3, wherein the group of LEDs is further configured and arranged such that, during at least a portion of each of said scan cycles, one or more LEDs included in the first plurality of LEDs are energized at the same time one or more LEDs included in the second plurality of LEDs are energized.

23. The method of claim 10, wherein the step (a) further comprises, during at least a portion of each of said scan cycles, energizing one or more of the LEDs included in the first plurality of LEDs at the same time one or more of the LEDs included in the second plurality of LEDs are energized.

24. The system of claim 16, wherein the group of LEDs is further configured and arranged such that, during at least a portion of each of said scan cycles, the at least one first LED of the first type is energized at the same time the at least one second LED of the second type is energized.

* * * * *

UNITED STATES PATENT AND TRADEMARK OFFICE
CERTIFICATE OF CORRECTION

| | | |
|---|---|---|
| PATENT NO. | : 7,855,348 B2 | Page 1 of 1 |
| APPLICATION NO. | : 11/824826 | |
| DATED | : December 21, 2010 | |
| INVENTOR(S) | : Mark D. Goodwin et al. | |

It is certified that error appears in the above-identified patent and that said Letters Patent is hereby corrected as shown below:

At column 15, line 27, in claim 1, please delete "," between "light" and "with".

Signed and Sealed this
Fifteenth Day of February, 2011

David J. Kappos
*Director of the United States Patent and Trademark Office*